(12) United States Patent
Ganapathy et al.

(10) Patent No.: US 9,980,126 B2
(45) Date of Patent: May 22, 2018

(54) COMMUNICATION SYSTEM

(75) Inventors: Suresh Ganapathy, London (GB); Milena Filipovic, London (GB); Neeraj Gupta, Tokyo (JP); Hiroaki Kuwano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 729 days.

(21) Appl. No.: 13/498,579

(22) PCT Filed: Sep. 27, 2010

(86) PCT No.: PCT/JP2010/067297
§ 371 (c)(1),
(2), (4) Date: Mar. 27, 2012

(87) PCT Pub. No.: WO2011/040616
PCT Pub. Date: Apr. 7, 2011

(65) Prior Publication Data
US 2012/0196598 A1    Aug. 2, 2012

(30) Foreign Application Priority Data

Sep. 29, 2009    (GB) .................................. 0917071.3

(51) Int. Cl.
| | |
|---|---|
| *H04W 88/08* | (2009.01) |
| *H04W 8/26* | (2009.01) |
| *H04W 36/00* | (2009.01) |
| *H04W 8/12* | (2009.01) |

(52) U.S. Cl.
CPC .......... *H04W 8/26* (2013.01); *H04W 36/0055* (2013.01); *H04W 8/12* (2013.01)

(58) Field of Classification Search
CPC .................................................... H04W 60/00

USPC ........................................................ 370/401
See application file for complete search history.

(56) References Cited

U.S. PATENT DOCUMENTS

| | | | | |
|---|---|---|---|---|
| 2005/0083971 | A1* | 4/2005 | Delaney et al. | 370/466 |
| 2008/0188220 | A1 | 8/2008 | DiGirolamo et al. | |
| 2009/0265543 | A1* | 10/2009 | Khetawat | H04W 12/08 713/151 |
| 2010/0040023 | A1* | 2/2010 | Gallagher | H04W 8/02 370/331 |

(Continued)

FOREIGN PATENT DOCUMENTS

| | | |
|---|---|---|
| CN | 1780481 A | 5/2006 |
| EP | 1 519 595 A1 | 3/2005 |

(Continued)

OTHER PUBLICATIONS

International Search Report in PCT/JP2010/067297 dated Feb. 17, 2011 (English Translation Thereof).

(Continued)

*Primary Examiner* — Edan Orgad
*Assistant Examiner* — Nourali Mansoury
(74) *Attorney, Agent, or Firm* — Sughrue Mion, PLLC

(57) ABSTRACT

A communication system is described in which mobile telephones are able to roam between neighboring home node base stations. Techniques are described for allocating U-RNTIs to mobile telephones by the home base stations or the home base station gateway. Techniques are also disclosed for target home base stations to be able to retrieve information needed to respond to a Cell Update request received from a mobile telephone.

7 Claims, 15 Drawing Sheets

(56) References Cited

U.S. PATENT DOCUMENTS

| | | | | |
|---|---|---|---|---|
| 2010/0041402 | A1* | 2/2010 | Gallagher | H04W 8/02 |
| | | | | 455/435.1 |
| 2010/0041403 | A1* | 2/2010 | Khetawat | H04W 8/02 |
| | | | | 455/435.1 |
| 2010/0041405 | A1* | 2/2010 | Gallagher et al. | 455/436 |
| 2012/0002659 | A1* | 1/2012 | Kawaguchi | H04W 36/0011 |
| | | | | 370/338 |

FOREIGN PATENT DOCUMENTS

| | | |
|---|---|---|
| EP | 1 292 168 B1 | 5/2009 |
| WO | 2008/097489 A2 | 8/2008 |
| WO | WO 2009/129516 A1 | 10/2009 |

OTHER PUBLICATIONS

Huawei:"Some Identifiers Consideration for 3G HNB" 3GPP Draft; R3-082035, 3$^{rd}$ Generation Partnership Project (3GPP), Mobile Competence Centre; 650, Route des Lucioles; F-06921 Sophia-Antipolis Cedex; France; vol. RAN WG3, No. Jeju Island; 20080813, Aug. 13, 2008(Aug. 13, 2008), XP050165091 p. 2, line 7-line 26.

Kineto Wireless Inc.: "Managing of U-RNTI over ther Iuh Interface",3 GPP Draft; R3-091884, 3$^{rd}$ Generation Partnership Project (3GPP) Mobile Competence Centre; 650, Route des Lucioles; F-06921 Sophia-Antipolis Cedex; France; vol. RAN WG3, No. Shenxhen, PRC; 20080824, Aug. 24, 2008(Aug. 24, 2008).

Kineto Wireless Inc.: "Handling of cell update for inner HNB mobility",3 GPP Draft; R3-091885, 3$^{rd}$ Generation Partnership Project (3GPP) Mobile Competence Centre; 650, Route des Lucioles; F-06921 Sophia-Antipolis Cedex; France; vol. RAN WG3, No. Shenxhen, PRC; Aug. 24, 2008, Aug. 24, 2008(Aug. 24, 2008).

3GPP TS 25.467, V8.2.0. (Jun. 2009),Technical Specification, 3$^{rd}$ Generation Partnership Project; Techincal Specification Group Radio Access Network; UTRAN architecture for 3G Home Node B (HNB) Stage 2 (Release 8).

3GPP TS 25.468, V8.1.0. (Jun. 2009),Technical Specification, 3$^{rd}$ Generation Partnership Project; Techincal Specification Group Radio Access Network; UTRAN Iu RANAP User Adaptation (RUA) signalling (Release 8).

3GPP TS 25.469, V8.2.0. (Jun. 2009),Technical Specification, 3$^{rd}$ Generation Partnership Project; Techincal Specification Group Radio Access Network; UTRAN Iu interface Home Node B Application Part (HNBAP) signalling (Release 8).

3GPP TS 36.413, V8.3.1. (Jun. 2009),Technical Specification, 3$^{rd}$ Generation Partnership Project; Technical Specification Group Radio Access Network; UTRAN Iu interface Radio Access Network Application Part (RANAP) signalling (Release 8).

3GPP TS 25.331 V8.6.0. (Mar. 2009), Technical Specification, 3$^{rd}$ Generation Partnership Project; Technical Specification Group Radio Access Network; Radio Resource Control (RRC); Protocol Specification (Release 8).

3GPP TS 24.008, V9.0.0. (Sep. 2009),Technical Specification, 3$^{rd}$ Generation Partnership Project; Technical Specification Group Core Network and Terminals; Mobile radio interface Layer 3 specification; Core Network protocols; Stage 3 (Release 9).

Chinese Office Action dated Feb. 28, 2014.

Korean Office Action dated Nov. 4, 2013.

ETSI TS 125 467 v.8.1.0 (Apr. 2009) Universal Mobile Telecommunications System (UMTS); UTRAN architecture for 3G Home NodeB; Stage 2 (3GPP TS 25.467 version 8.1.0 Release 8), (Apr. 30, 2009).

Communication dated Jan. 29, 2018, from State Intellectual Property Office of the P.R.C. in counterpart application No. 201510518744.7.

* cited by examiner

COMMUNICATION SYSTEM

TECHNICAL FIELD

The present invention relates to mobile telecommunication networks, particularly but not exclusively networks operating according to the 3GPP ($3^{rd}$ Generation Partnership Project) standards or equivalents or derivatives thereof. The invention has particular although not exclusive relevance to the setting of the UTRAN Radio Network Temporary Identifier (U-RNTI) for a mobile communication device and its use during cell updates.

BACKGROUND ART

Under the 3GPP standards, a NodeB is the base station via which mobile devices connect to the core network. Recently the 3GPP standards body has adopted an official architecture and started work on a new standard for home base stations (HNB). One or more HNBs will provide radio coverage within the home and will connect to the core network via one or more suitable public networks (for example via an ADSL link to the Internet) via an HNB gateway (HNB-GW) which will aggregate traffic from the one or more HNBs.

When User Equipment (UE) attempts to make an RRC Connection in the macro UTRAN network, a Radio Network Controller (RNC) will allocate the U-RNTI to the UE to identify the UE to the network. However, with HNBs, the RNC functionality is divided between the HNB and the HNB-GW and at present it is not clear which entity will be responsible for allocating the U-RNTI.

A separate but related problem relates to mobility of UEs when in the CELL FACH connected state. Such mobility is not supported in Release 8 (Rel'8), but is currently under discussion in Release 9 (Rel'9). In the CELL FACH state, the UE makes the decision to handover to another (target) HNB and sends the target HNB an RRC CELL UPDATE message indicating that it wants to handover to the target HNB. The target HNB or the HNB-GW must then be able to identify the source HNB with which the UE is currently registered, so that it can obtain various Information Elements (IEs) from the source HNB that will allow the target HNB to be able to communicate with the UE.

DISCLOSURE OF INVENTION

According to one exemplary aspect, the present invention provides a method performed by a home base station of a communications network, the method comprising: sending a request for a temporary identifier, such as a U-RNTI, to a gateway device in response to a received connection request from a user device; receiving the temporary identifier from the gateway device; and sending the received temporary identifier to the user device. In one exemplary embodiment, the temporary identifier is sent to the user device prior to registering the user device with the gateway device. The request for the temporary identifier may be sent in an HNBAP request message and the temporary identifier may be received in an HNBAP response message.

The data sent to the gateway is sent over a public data network, such as the internet and the data is encapsulated in appropriate IP packets that are sent between the home base station and the gateway.

Subsequent to sending the temporary identifier to the user device, the method may include sending a request to register the user device to the gateway device.

The present invention also provides a method performed by a gateway device of a communications network, the method comprising: receiving, from a home base station, a request for a temporary identifier, such as a U-RNTI, for a user device; generating a temporary identifier for the user device; and sending the generated temporary identifier to the home base station. Preferably, the temporary identifier is sent prior to a registration step performed to register the user device with the gateway device. The request for the temporary identifier can be received in an HNBAP request message and the temporary identifier can be sent in an HNBAP response message.

The present invention also provides a home base station comprising: means for sending a request for a temporary identifier to a gateway device in response to a received connection request from a user device; means for receiving the temporary identifier from the gateway device; and means for sending the received temporary identifier to the user device, preferably prior to registering the user device with the gateway device.

The present invention also provides a gateway device comprising: means for receiving, from a home base station, a request for a temporary identifier for a user device; means for generating a temporary identifier for the user device; and means for sending the generated temporary identifier to the home base station.

According to another exemplary aspect, the present invention also provides a method performed by a user device that communicates with a communications network via a home base station, wherein the method comprises receiving a temporary identifier from the home base station when the user device moves from an Idle state to a Connected state and maintaining the temporary identifier when the user device moves from the connected state to the Idle state.

According to this exemplary aspect, the invention also provides a method performed by a home base station that provides communication service to one or more user devices, the method comprising providing a user device with a temporary identifier when the user device moves from an Idle state to a Connected state and maintaining the temporary identifier when the user device moves from the Connected state to the Idle state.

This exemplary aspect also provides a user device operable to communicate with a communications network via a home base station, wherein the user device is operable to receive a temporary identifier from the home base station when moving from an Idle state to a Connected state and is operable to maintain the temporary identifier when moving from the connected state to the Idle state. The temporary identifier may be the U-RNTI of the user device.

This exemplary aspect also provides a home base station operable to provide communication service to one or more user devices and operable to provide a user device with a temporary identifier when the user device moves from an Idle state to a Connected state and operable to maintain the temporary identifier when the user device moves from the Connected state to the Idle state.

According to a further exemplary aspect, the present invention also provides a method performed by an HNB management system, the method comprising: receiving and maintaining information on a home base station; allocating a Radio Network Controller Identification, RNCID, to the home base station; sending the allocated RNCID to the home base station; identifying neighbouring base stations in the vicinity of the home base station; and sending the home base station the RNCIDs of the identified neighbouring base stations.

In one exemplary embodiment the allocated RNCID is unique at least within the vicinity of the home base station.

This exemplary aspect also provides a method performed by a home base station, the method comprising: receiving a Radio Network Controller Identification, RNCID, from an HNB management system; and receiving neighbour cell information for neighbouring cells in the vicinity of the home base station, the received neighbour cell information including the RNCID for one or more of the neighbouring base stations.

The method may further comprise receiving a cell update message from a user device, decoding a temporary identifier of the user device to identify an RNCID of a serving cell, and identifying the serving cell from the received neighbour cell information.

The home base station may then send a message towards the identified serving cell to retrieve information from the serving cell relating to the user device so that the home base station can respond to the cell update message.

The present invention also provides an HNB management system comprising: means for receiving and maintaining information on a home base station; means for allocating a Radio Network Controller Identification. RNCID, to the home base station; means for sending the allocated RNCID to the home base station; means for identifying neighbouring base stations in the vicinity of the home base station; and means for sending the home base station the RNCIDs of the identified neighbouring base stations.

This exemplary aspect of the invention also provides a home base station comprising: means for receiving a Radio Network Controller Identification, RNCID, from the HNB management system; and means for receiving neighbour cell information for neighbouring cells in the vicinity of the home base station, the received neighbour cell information including the RNCID for one or more of the neighbouring base stations.

A further exemplary aspect of the invention provides a method performed by a gateway device, the method comprising: holding data defining an association between RNCIDs and the home base stations to which those RNCIDs have been allocated; receiving a message from a first home base station, the message including an RNCID for a second home base station; using the received RNCID to identify the second home base station from the held data; and forwarding the message to the identified second home base station.

This exemplary aspect may further comprise receiving a message from the second home base station and forwarding the message to the first home base station.

The message received from the second home base station may include data identifying the first home base station or the gateway may store data identifying the first home base station in association with the second home base station and identifying the first home base station from the stored data.

The gateway may obtain the RNCIDs for each of the HNBs from the HNBs themselves or from the HMS.

This exemplary aspect of the invention also provides a method performed by a home base station, the method comprising: receiving a cell update message from a user device; decoding the update message to determine an RNCID for a serving base station; sending a message to a gateway device, the message including the determined RNCID and data from the cell update message relating to the user device; receiving a message from the serving base station via the gateway device, the message including data required by the home base station to respond to the cell update message; and responding to the cell update message using the data received from the gateway device. The message sent may include routing information for the home base station.

The invention also provides a gateway device comprising: means for holding data defining an association between RNCIDs and the home base stations to which those RNCIDs have been allocated; means for receiving a message from a first home base station, the message including an RNCID for a second home base station; means for using the received RNCID to identify the second home base station from the held data; and means for forwarding the message to the identified second home base station.

This exemplary aspect also provides a home base station comprising: means for receiving a cell update message from a user device; means for decoding the cell update message to determine an RNCID for a serving base station; means for sending a message to a gateway device, the message including the determined RNCID and data from the cell update message relating to the user device; means for receiving a message from the serving base station via the gateway device, the message including data required by the home base station to respond to the cell update message; and means for responding to the cell update message using the data received from the gateway device.

According to a further exemplary aspect, the present invention also provides a method performed by an HNB management system, the method comprising: receiving and maintaining information on a home base station when the base station is powered up; allocating a Radio Network Controller Identification, RNCID, to the home base station; sending the allocated RNCID to the home base station; identifying neighbouring base stations in the vicinity of the home base station; and sending the home base station data indicating if the neighbouring base station is an HNB or a macro base station. The data indicating if the neighbouring base station is an HNB or a macro base station may include an Information Element (IE) identifying if the neighbouring base station is an HNB or a macro. Alternatively the data indicating if the neighbouring base station is an HNB or a macro base station may include data identifying a range of RNCIDs that are used for HNBs and a range of RNCIDs that are used for macro base stations.

This exemplary aspect of the invention also provides a method performed by a home base station, the method comprising: providing information for an HNB management system; receiving a Radio Network Controller Identification, RNCID, from the HNB management system; and receiving neighbour cell information for neighbouring cells in the vicinity of the home base station, the received neighbour cell information including data indicating if the neighbouring base station is an HNB or a macro base station.

The method may further comprise receiving a cell update message, decoding the cell update message to identify an RNCID of a serving base station and determining from the identified RNCID and the received neighbour cell information if the serving base station is a macro cell or a home base station.

In one exemplary embodiment, the method further comprises obtaining information required to respond to the cell update message using a first process if the serving base station is a macro base station and obtaining the information required to respond to the cell update message using a second process if the serving base station is a home base station.

This exemplary aspect also provides an HNB management system comprising: means for receiving and maintaining information on a home base station when the base station is powered up; means for allocating a Radio Network Controller Identification, RNCID, to the home base station; means for sending the allocated RNCID to the home base station; means for identifying neighbouring base stations in the vicinity of the home base station; and means for sending the home base station data indicating if the neighbouring base station is an HNB or a macro base station.

This exemplary aspect also provides a home base station comprising: means for providing information for an HNB management system; means for receiving a Radio Network Controller Identification, RNCID, from the HNB management system; and means for receiving neighbour cell information for neighbouring cells in the vicinity of the home base station, the received neighbour cell information including data indicating if the neighbouring base station is an HNB or a macro base station.

The invention also provides, for all methods disclosed, corresponding computer programs or computer program products for execution on corresponding user communications devices or network communications devices. The invention also provides user communications devices and network communications devices configured or operable to implement the methods and components thereof) and methods of updating these.

Exemplary embodiments of the invention will now be described, by way of example, with reference to the accompanying drawings in which:

BEST MODE FOR CARRYING OUT THE INVENTION

With reference to the drawings in general, it should be understood that any functional block diagrams are intended simply to show the functionality that may exist within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hardwired elements, software elements or firmware elements or any combination of these.

Overview

Figure 1:
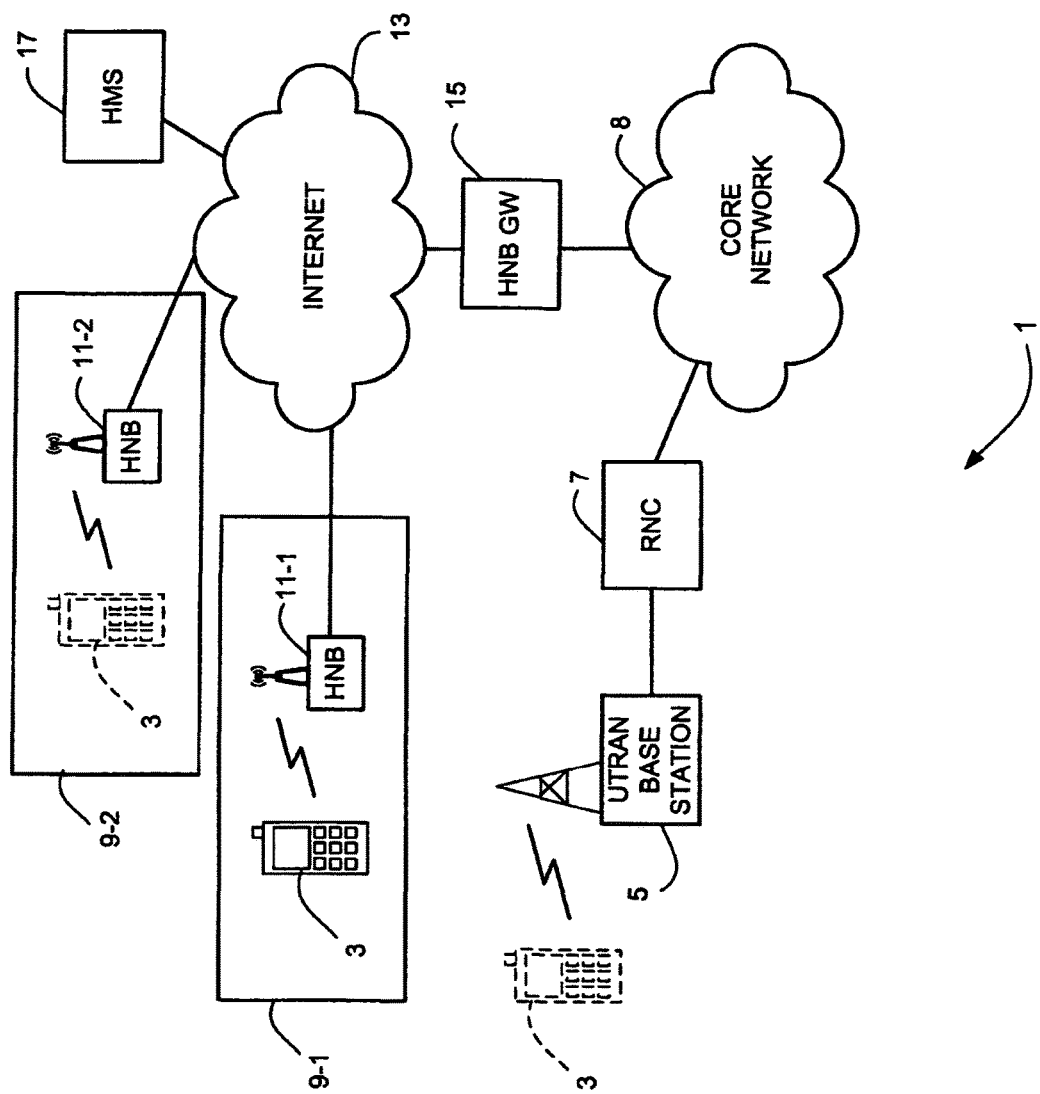
FIG. 1 schematically illustrates a mobile telecommunication system of a type to which the embodiment is applicable.

FIG. 1 schematically illustrates a mobile (cellular) telecommunication system 1 in which a user of a mobile telephone (MT) 3 can communicate with other users (not shown) via a macro cell of a UTRAN base station 5 and Radio Network Controller (RNC) 7 and a core network (CN) 8 when the user is away from a 'home' base station (HNB) based cell 9-1. When the user is within the HNB based cell 9-1, the user can also communicate with the other users (not shown) via an HNB 11-1, a public data network (in this case the Internet 13), a home base station gateway (HNB-GW) 15 and the core network 8. The HNB 11-1 will typically connect to the respective HNB-GW 15 via a suitable Internet connection such as an ADSL or cable connection and is programmed with the IP address of the HNB-GW 15 so that all uplink communications are transmitted via the respective HNB-GW 15. A second HNB 11-2 is illustrated having its own cell 9-2 and the mobile telephone 3 is able to roam from one HNB 11 to the other, depending on which one provides the best connection. FIG. 1 also shows an HNB Management System (HMS) 17 that is responsible for providing the HNBs 11 with various information (including neighbour cell information that identifies neighbouring base stations) during an initialisation/discovery procedure. The HMS 17 also updates the information provided to HNBs 11 as new neighbours come on-line or when old neighbours go off-line.

1. U-RNTI Allocation

When the mobile telephone 3 attempts to make an RRC Connection in the macro cell of the UTRAN base station 5, the RNC 7 is responsible for U-RNTI allocation and will send the allocated U-RNTI to the mobile telephone 3 in an RRC CONNECTION SETUP message. However, when the mobile telephone 3 attempts to make an RRC Connection in an HNB based cell 9, since the RNC functionality is divided between the HNB 11 and the HNB-GW 15, it is not clear which entity is responsible for U-RNTI allocation.

1.1 U-RNTI Allocation by HNB

If U-RNTI allocation is performed by the HNB 11, then the U-RNTI can be allocated based on the gateway RNC-ID (GW-RNC-Id defined in TS 25.469 Section 9.2.26), which is received in the HNBAP UE REGISTER ACCEPT message that the HNB 11 receives from the HNB-GW 15 at the time that the mobile telephone 3 registers with the HNB 11 and HNB-GW 15. Alternatively, the U-RNTI can be allocated based on the HNB RNC-ID (RNCID-for-HNB defined in TS 25.467 Section 6.1.4.3) allocated by the HMS 17 during the HNB Initialization/Discovery procedure. Since the gateway RNC-ID could be the same for all HNBs 11 registered with one HNB-GW 15, the inventors propose that where the HNB 11 allocates the U-RNTI, it does so using its RNC-ID (RNCID-for-HNB). The inventors also propose that the HMS 17 sends each HNB 11 a unique RNCID-for-HNB.

1.2 U-RNTI Allocation by HNB-GW

If the U-RNTI allocation is performed by the HNB-GW 15, then the HNB-GW 15 will take care of uniqueness of the U-RNTI allocated to each mobile telephone 3. Additionally, in this case, the HNB-GW 15 will provide the U-RNTI to the HNB 11 during the RRC Connection Setup procedure for the mobile telephone 3 so that the HNB 11 can send the U-RNTI to the mobile telephone 3 in the RRC CONNECTION SETUP message.

Figure 2:
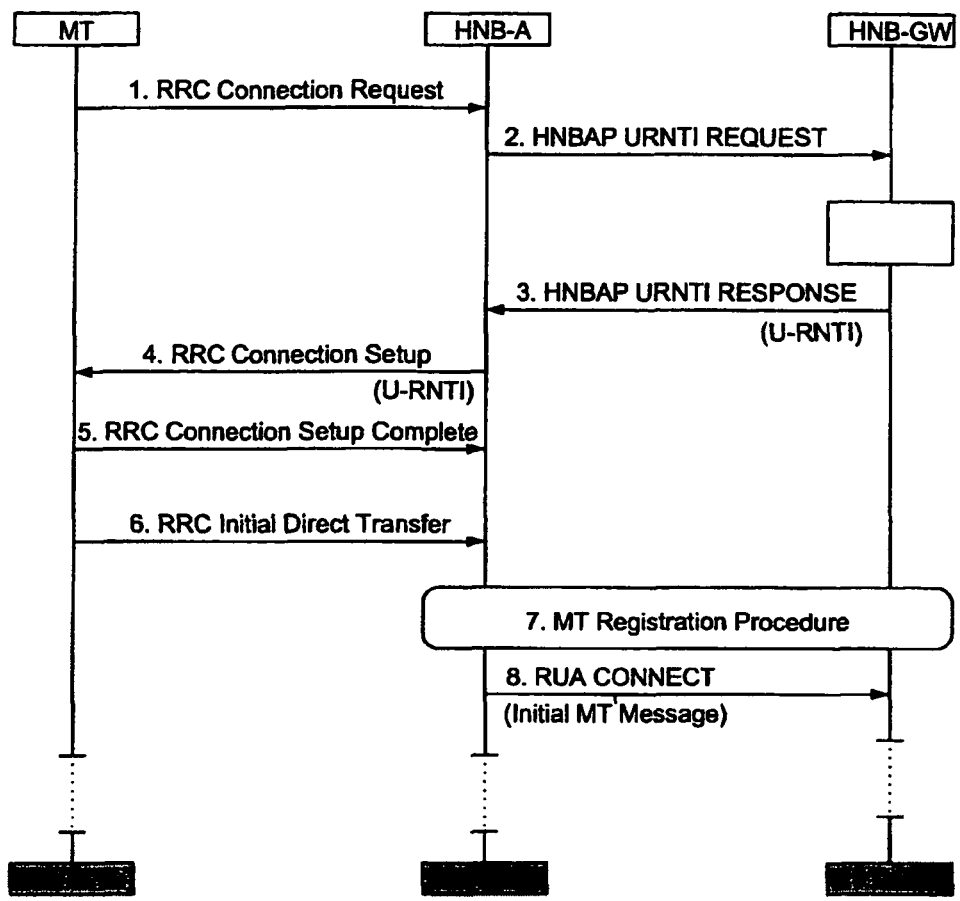
FIG. 2 is a timing diagram illustrating the way in which a U-RNTI can be allocated to a mobile telephone.

In his regard, the currently defined version of the standard (TS 25.467 V8.2.0 Sections 5.1.2 and 5.1.3) defines that the first mobile telephone specific communication transmitted between the HNB 11 and the HNB-GW 15 is done when the mobile telephone 3 sends an RRC Initial Direct Transfer message. However, in accordance with this proposal, the HNB 11 will interact with the HNB-GW 15 prior to this in order to get the unique U-RNTI from the HNB-GW 15. This process is illustrated in FIG. 2. As shown, in response to the mobile telephone 3 making an RRC Connection Request to the HNB 11 at step 1, the HNB 11 generates and transmits a new HNBAP URNTI REQUEST message to the HNB-GW 15 at step 2. The HNB-GW 15 then generates a U-RNTI for the mobile telephone 3 and sends this back to the HNB 11 in a new HNBAP URNTI RESPONSE message at step 3. In response to receiving the U-RNTI for the mobile telephone 3, the HNB 11 sends an RRC Connection Setup message that includes the allocated U-RNTI in step 4. The mobile telephone 3 then sends the RRC Connection Setup Complete message in step 5 and can then send, in step 6, the RRC Initial Direct Transfer message to the HNB 11. The HNB 11 then initiates, in step 7, a registration procedure with the HNB-GW 15 following completion of which the HNB 11 can send the RUA CONNECT message to the HNB-GW in step 8.

According to 3GPP Technical Specification TS 25.331 V8.6.0, a U-RNTI exists for a mobile telephone 3 when it is in a connected state and will be released if the mobile telephone 3 moves to an IDLE state. Then, if the mobile telephone 3 establishes a connection to the same HNB 11 again, since the context already exists for this mobile telephone 3, the mobile telephone Registration procedure will not be performed again, although a new HNBAP procedure (HNBAP UE U-RNTI Request/Response) will have to be performed again to allocate a new U-RNTI for the mobile telephone 3. In a preferred exemplary embodiment, however, since the context of the mobile telephone 3 is maintained by the HNB 11 during the IDLE state, the U-RNTI may also be maintained by both the mobile telephone 3 and the HNB 11 when the mobile telephone 3 moves to the IDLE state. In this way, a new U-RNTI does not have to be reallocated if the mobile telephone 3 returns to its connected mode.

2. Cell Update Handling

As mentioned above, when the mobile telephone 3 is in its CELL FACH connected state, it can send a Cell Update message to a target HNB (eg HNB 11-2) when it wants to move to that HNB 11-2. The target HNB 11-2 must retrieve various information from the serving base station—which may be another HNB (eg HNB 11-1) or a macro base station 5. There are various ways that the target HNB 11-2 can retrieve this information and the one that is used will depend on how the U-RNTI has been allocated and on whether the source is a macro base station 5 or another HNB 11.

2.1 Cell Update Handling—HNB to HNB

In Rel'9 there are 6 possible ways of allocating U-RNTI in an HNB network:
1. U-RNTI Allocation based on PLMN-wide unique RNCID-for-HNB
2. U-RNTI Allocation based on PLMN-wide unique GW-RNC-Id
3. U-RNTI Allocation based on vicinity-wide unique RNCID-for-HNB
4. U-RNTI Allocation based on vicinity-wide unique GW-RNC-Id
5. U-RNTI Allocation based on "non" unique RNCID-for-HNB
6. U-RNTI Allocation based on "non" unique GW-RNC-Id The Cell Update handling procedure for (1) is the same as that for (3) and the Cell Update handling procedure for (2) is the same as that for (4). The Cell update handling procedure for case (5) will not be explained because it is unnecessarily complex.

Thus the following Cell Update handling scenarios will now be described:
Cell Update handling with unique (at least in vicinity) RNCID-for-HNB used for U-RNTI Allocation (1) and (3)
Cell Update handling with unique (at least in vicinity) GW-RNC-Id used for U-RNTI Allocation (2) and (4)
Cell Update handling with "not" unique GW-RNC-Id used for U-RNTI Allocation (6)

For the routing of Cell Update messages between the source HNB 11-1 and the target HNB 11-2, new HNBAP messages shall be defined or existing RNSAP messages will be used.

2.1.1 Cell Update Handling when Unique RNCID-for-HNB is Used for U-RNTI Allocation 2.1.1.1 Alternative 1: RNCID-for-HNB for each Neighbour Kept in Each HNB 11

In this case, each HNB 11 maintains the RNCID-for-HNB for each of its neighbours in its neighbour cell information table. This table is populated and updated from time to time when new neighbours are detected or when some neighbours are powered down. In this embodiment, the HMS 17 will supply the HNB 11 with the RNCID-for-HNB for each of the neighbouring HNBs 11. This information can be provided during a Discovery procedure that is performed when the HNB 11 registers with the HNB-GW 15 and is updated by the HMS 17 at regular intervals or when the neighbouring cell information changes. In this exemplary embodiment, the neighbour cell information table 1) includes the following information:

TABLE 1

Example Neighbour Cell Information with RNCID-for-HNB at HNB in Rel'9

| Neighbour Cell# | Scrambling Code | Cell ID | RNC ID(*) | CSG ID | RNCID-for-HNB |
|---|---|---|---|---|---|
| 1 (HNB Cell) | 100 | 200 | GW-RNC-Id = 1 | 10 | 111 |
| 2 (HNB Cell) | 101 | 201 | GW-RNC-Id = 1 | 20 | 222 |
| 3 (HNB Cell) | 102 | 202 | GW-RNC-Id = 1 | 30 | 333 |
| 4 (HNB Cell) | 103 | 203 | GW-RNC-Id = 1 | 4 | 444 |
| 5 (Macro Cell) | 104 | 204 | 2 | Not Applicable | Not Applicable |
| 6 (Macro Cell) | 105 | 205 | 2 | Not Applicable | Not Applicable |

(*)This RNC ID is used in RANAP RELOCATION REQUIRED message

Figure 3:
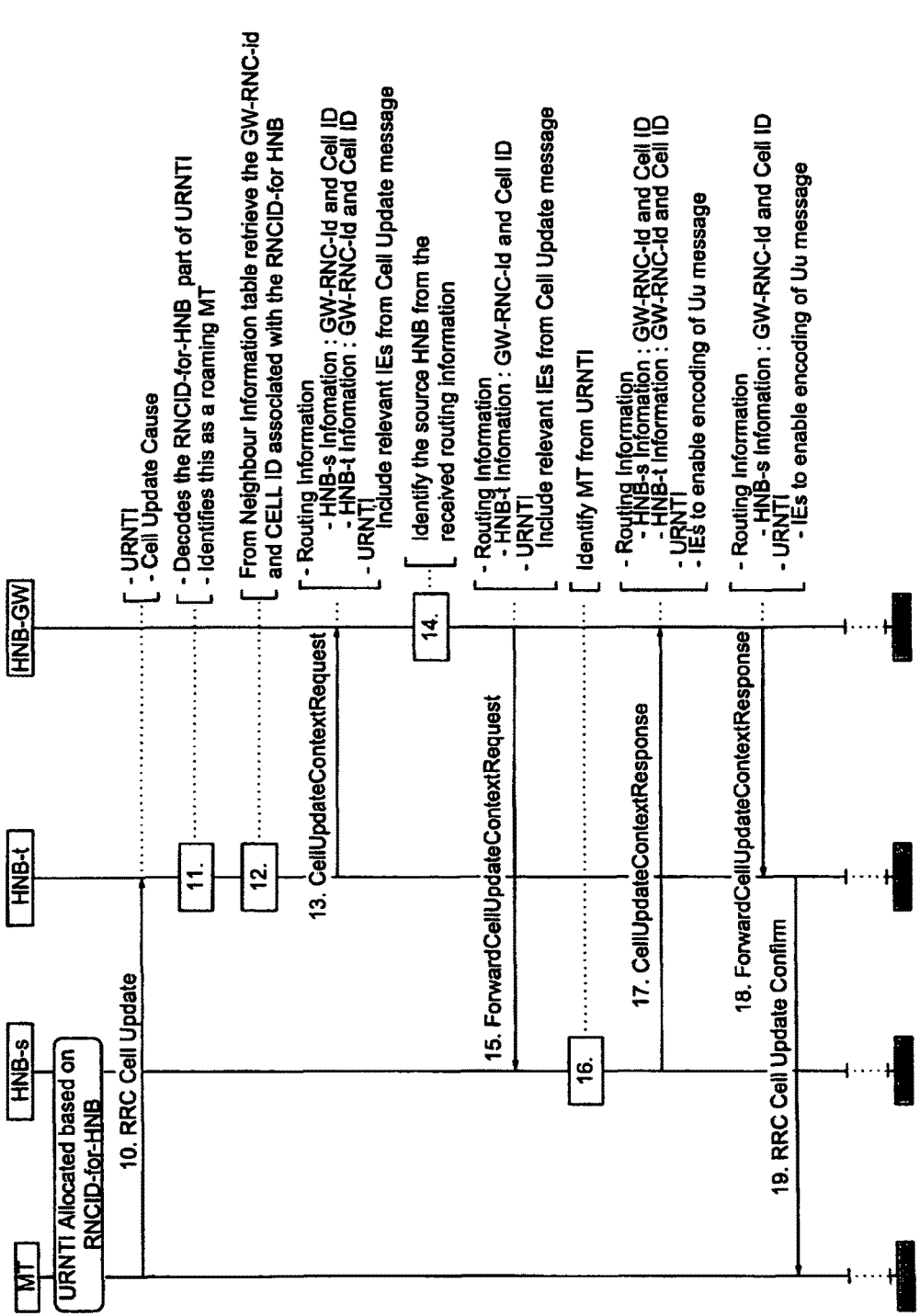
FIG. 3 is a timing diagram illustrating one way in which an RRC CELL UPDATE message may be handled.

The Cell Update handling procedure used in this case is illustrated in FIG. 3. As shown, at step 10, the mobile telephone (MT) 3 sends the RRC Cell Update message to the target HNB 11-2 (HNB-t). The target HNB 11-2 receives the Cell Update message and processes it in step 11 to decode the U-RNTI to determine the RNCID-for-HNB for the serving cell. If the determined RNC-for-HNB is not its own RNCID, then the target HNB identifies that the mobile telephone 3 is roaming. In step 12, the target HNB 11-2 uses the determined RNC-for-HNB to look up the GW-RNC-Id and CELL ID of the source HNB 11-1 (HNB-s) in the above neighbour cell table.

The target HNB 11-2 then sends, in step 13, a message (Cell Update Context Request) to the HNB-GW 15 for forwarding on to the correct source HNB 11-1. The message includes the source HNB 11-1 information (GW-RNC-Id and CELL ID) and target HNB 11-2 information (GW-RNC-Id and CELL ID). The message also includes mobile telephone 3 information (U-RNTI and other relevant IEs from the Cell Update message). In step 14, the HNB-GW 15 looks into a few IEs of the received message to identify the source HNB 11-1 or its gateway (from GW-RNC Id and CELL ID). The HNB-GW 15 then forwards the message in step 15, in this case to the identified source HNB 11-1. The source HNB 11-1, then checks the URNTI in step 16 to identify the mobile telephone 3. The source HNB 11-1 then sends, in step 17, a Cell Update Context Response message back to the HNB-GW 15. This response message has all the necessary IEs required by the target HNB 11-2 to encode the RRC CELL UPDATE CONFIRM message and includes the source HNB 11-1 information and the target HNB 11-2 information and the U-RNTI. The HNB-GW 15 looks into a few IEs of the received message to identify the target HNB 11-2 or its gateway (from GW-RNC Id and CELL ID). The HNB-GW 15 then forwards the message in step 18, in this case to the identified target HNB 11-2. The target HNB 11-2 can then use the received information to encode the RRC CELL UPDATE CONFIRM message that it transmits back to the mobile telephone 3 in step 19 to complete the Cell Update procedure.

2.1.1.2 Alternative 2: RNCID-for-HNB for each Neighbour Kept at HNB-GW

Alternative 1 discussed above suffers from the problem that frequent updates of the neighbour cell information will be required because each HNB 11 is provided with the RNCID-for-HNB of all its current neighbours. Additionally, due to the delay in HMS signalling of the updates, the neighbour information that is stored in an HNB 11 may not be up to date.

In Alternative 2, the HNB-GW 15 stores the RNCID-for-HNB for each HNB 11. In this embodiment, each HNB 11 informs the HNB-GW 15 of its RNCID-for-HNB. This can be done by the HNB 11 including its RNCID-for-HNB in a new IE of the HNBAP HNB REGISTER REQUEST message that the HNB 11 transmits to the HNB-GW when it powers up and registers itself with the gateway 15. This is illustrated in the following table (Table 2):

HNB Register Request

TABLE 2

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| HNB Identity | M | | 9.2.2 | | YES | reject |
| HNB Location Information | M | | 9.2.3 | | YES | reject |
| PLMN-ID | M | | 9.2.14 | | YES | reject |
| Cell-ID | M | | 9.2.25 | | YES | reject |
| LAC | M | | 9.2.11 | | YES | reject |
| RAC | M | | 9.2.12 | | YES | reject |
| SAC | M | | 9.2.13 | | YES | reject |
| SRNC ID | M | | x.x.x.x | HNB encodes the RNCID-for-HNB received from HMS. HNB-GW shall use this SRNC ID for U-RNTI Allocation | YES | reject |
| CSG-ID | O | | 9.2.27 | | YES | reject |

Figure 4A:
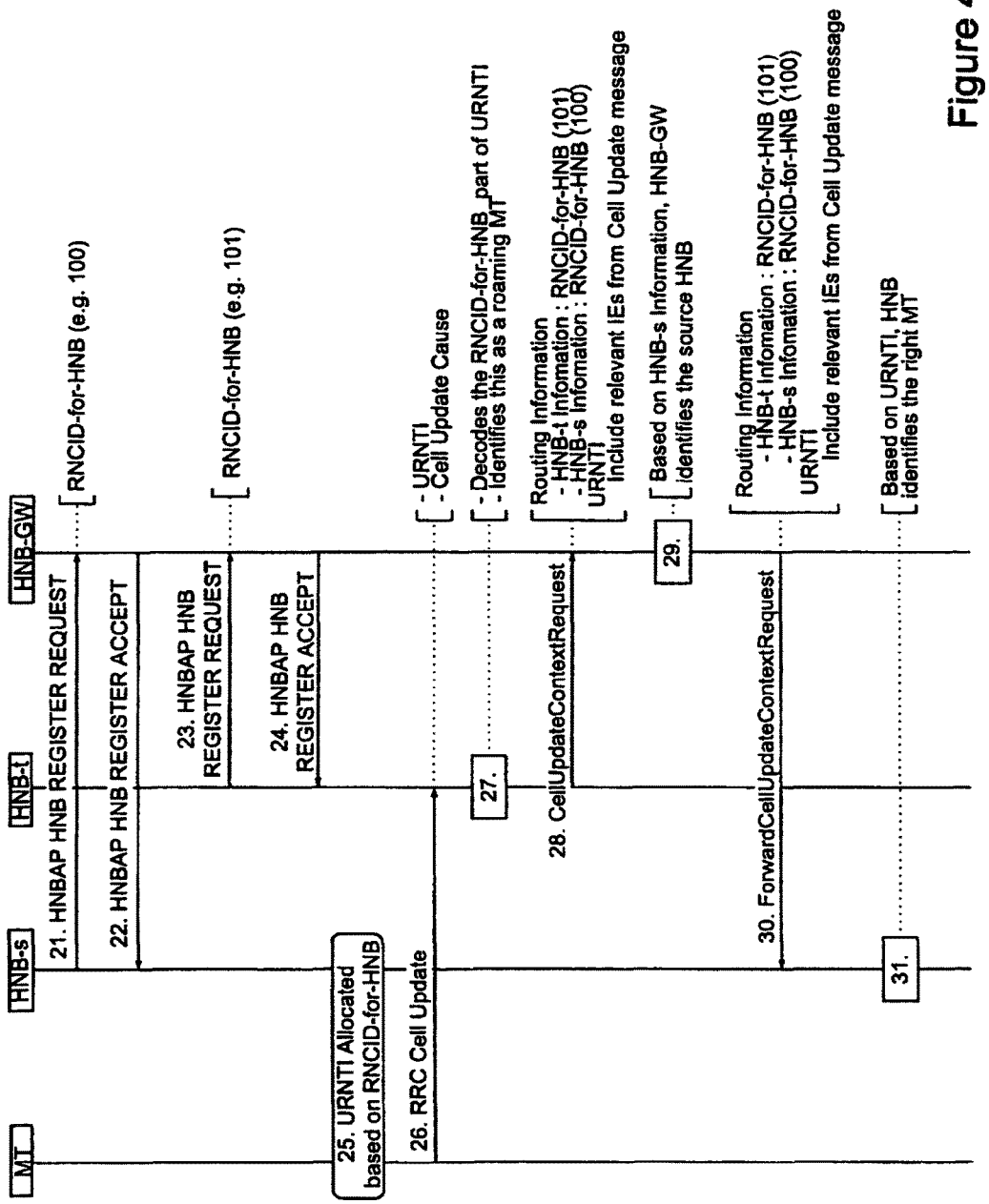
FIG. 4, composed of FIGS. 4a and 4b, is a timing diagram illustrating another way in which an RRC CELL UPDATE message may be handled.

The signalling procedure used in this alternative is illustrated in FIG. 4. As shown in steps 21 to 24, the source HNB 11-1 and the target HNB 11-2 register themselves with the HNB-GW 15 using the above HNB REGISTER REQUEST. This provides the HNB-GW 15 with the RNCID-for-HNB for both the source HNB 11-1 and the target HNB 11-2, which the HNB-GW 15 stores for subsequent use. In step 25, the source HNB 11-1 allocates a U-RNTI to a mobile telephone 3. Later, at step 26, the mobile telephone 3 sends a Cell Update message to the target HNB 11-2. The target HNB 11-2 processes the received message at step 27, to decode the U-RNTI to determine the RNCID-for-HNB of the serving base station. In this exemplary example, the target HNB 11-2 will find that the determined RNCID-for-HNB is not its own, thereby identifying that the mobile telephone 3 is roaming. At step 28, the target HNB 11-2 will transmit a message (Cell Update Context Request) to the HNB-GW 15 having routing information that has its own RNCID-for-HNB and the RNCID-for-HNB for the source HNB 11-1. The message also includes the U-RNTI for the mobile telephone 3 together with relevant IEs from the Cell Update message. The gateway 15 receives and processes the message and determines from the RNCID-for-HNB that was decoded by the target HNB 11-2, which base station is the source base station (in this case HNB 11-1). This is possible as there is a one to one mapping between the RNCID-for-HNB and the Cell ID because the Cell ID is unique in the PLMN and the HMS 17 ensures that neighbouring HNBs 11 do not have the same RNCID-for-HNB. The HNB-GW 15 then sends the source HNB 11-1 a message (Forward Cell Update Context Request) in step 30, that includes the relevant routing and U-RNTI information. The source HNB 11-1 receives the message and at step 31 identifies the mobile telephone 3 from the U-RNTI that is included within the message.

Figure 4B:
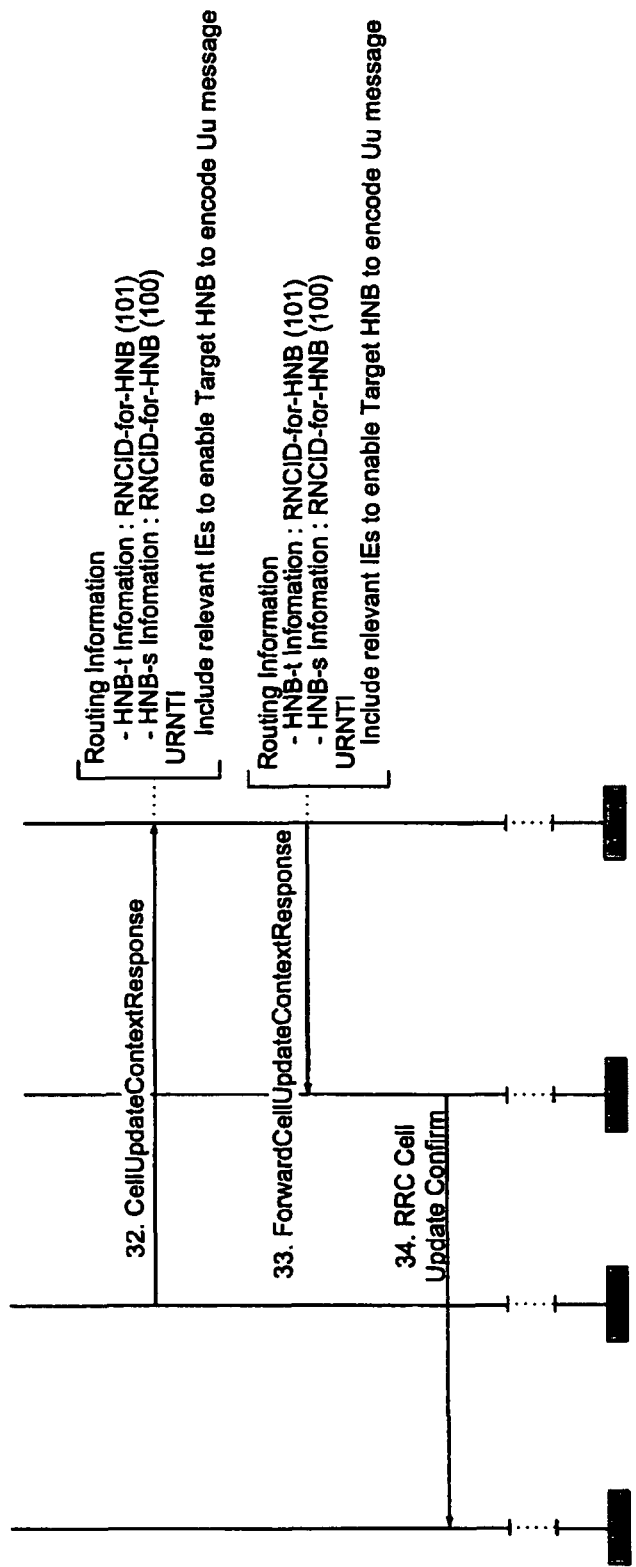

As illustrated in FIG. 4b, the source HNB 11-1 then sends, in step 32, all the necessary IEs required for encoding the RRC CELL UPDATE CONFIRM message back to the HNB-GW 15. This information is sent in a Cell Update Context Response message that again includes the source HNB 11-1 information and the target HNB 11-2 information and the U-RNTI. The HNB-GW 15 looks into a few IEs of the received message to identify the target HNB 11-2 or its gateway. The HNB-GW 15 then forwards the message in step 33, in this case to the identified target HNB 11-2. The target HNB 11-2 can then use the received information to encode the RRC CELL UPDATE CONFIRM message that it transmits back to the mobile telephone 3 in step 34 to complete the Cell Update procedure.

2.1.2 Cell Update Handling when Unique GW-RNC-Id is Used for U-RNTI Allocation

In this alternative, the HNB-GW 15 sends each HNB 11 a different (unique) GW-RNC-Id. This GW-RNC-Id (together with the Cell ID in the neighbour information table, in case uniqueness is limited to vicinity) is used for routing purposes i.e. to identify the correct source HNB 11-1. The source HNB 11-1 can then identify the mobile telephone 3 based on the URNTI as before. In this approach, the HNB-GW 15 is unaware of the U-RNTI.

Figure 5:
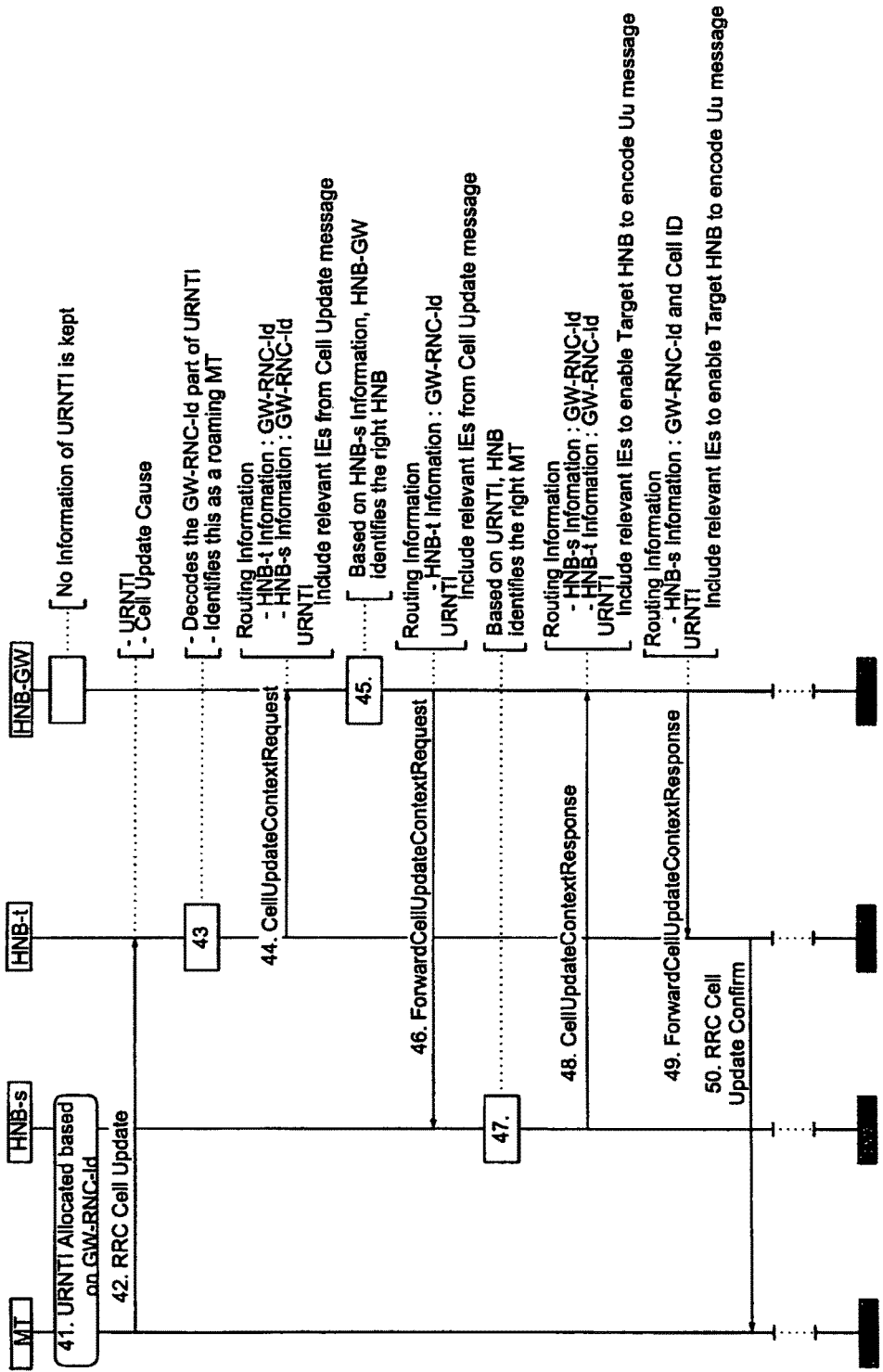
FIG. 5 is a timing diagram illustrating another way in which an RRC CELL UPDATE message may be handled.

The signalling sequence of this exemplary embodiment is shown in FIG. 5 and follows a similar sequence as that shown in FIG. 3. The main difference being that the target HNB 11-2 decodes the GW-NC-Id from the U-RNTI and passes this to the gateway 15. As the gateway 15 allocated the GW-RNC-Id to each HNB 11, it can identify which HNB is the correct source HNB 11-1. The remaining steps are the same as before and so will not be described again.

The HNB-GW 15 can allocate a unique GW-RNC-Id to an HNB 11 in two ways:
1. HNB-GW 15 sends each HNB 11 a different GW-RNC-Id but maintains a single RNC ID towards the core network 8 i.e. the core network 8 sees the HNBs 11 within an HNB-GW 15 as one RNC. The HNB-GW 15 then replaces the GW-RNC-Id sent in RANAP messages by an HNB 11 with the RNC ID known by the core network 8 and vice versa.
2. HNB-GW 15 sends each HNB 11 a different GW-RNC-Id which is also known to the core network 8. The core network 8 sees each HNB 11 as individual RNCs.

Figure 6:
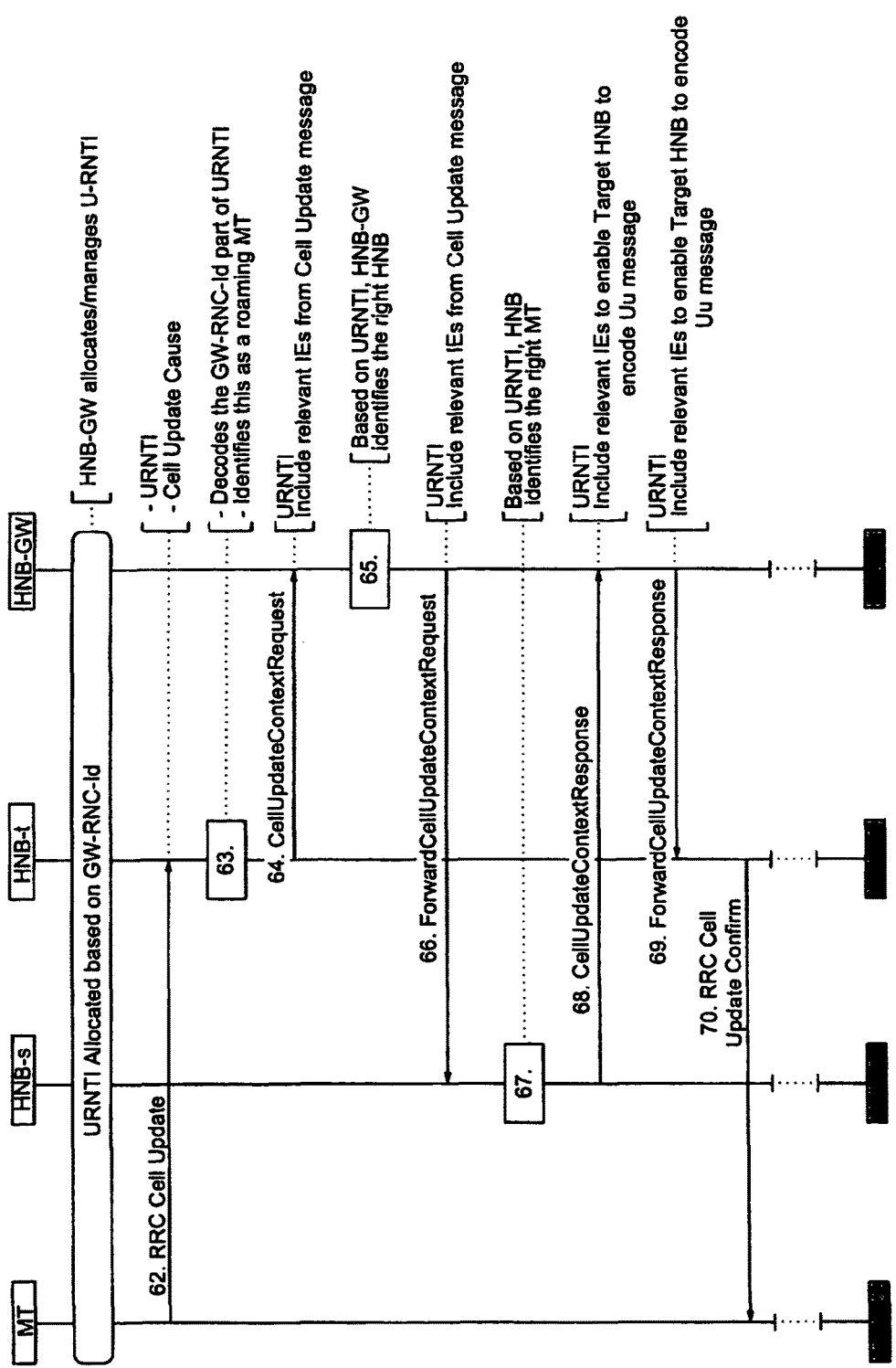
FIG. 6 is a timing diagram illustrating another way in which an RRC CELL UPDATE message may be handled.

2.1.3 Cell Update Handling when "not" Unique GW-RNC-Id is Used for U-RNTI Allocation In this case, the HNB-GW 15 is responsible for allocating the U-RNTIs to the mobile telephones 3 and maintains information identifying which HNB 11 is serving which U-RNTI. The signalling sequence of this alternative is illustrated in FIG. 6. As shown, in step 62 the mobile telephone 3 sends the RRC Cell Update message to the target HNB 11-2. The target HNB 11-2 decodes the U-RNTI in step 63 to determine the GW-RNC-Id and from this determines that the mobile telephone 3 is roaming. The target HNB 11-2 then sends the HNB-GW 15 a Cell Update Context Request message in step 64 that includes the U-RNTI and relevant IEs from the Cell Update message. The HNB-GW 15 processes the message in step 65 and based on the U-RNTI identifies the source HNB 11-1. The HNB-GW 15 also stores data identifying the target HNB 11-2 in association with the U-RNTI. The HNB-GW 15 then sends the identified source HNB 11-1 a message (Forward Cell Update Context Request) in step 66 that includes the U-RNTI and the relevant IEs from the Cell Update message. The source HNB 11-1 processes the message in step 67 to identify the mobile telephone 3 from the U-RNTI. The source HNB 11-1 then sends, in step 68, the HNB-GW 15 a Cell Update Context Response message that includes the U-RNTI and the relevant IEs that will allow the target HNB 11-2 to encode the RRC CELL UPDATE CONFIRM message. The HNB-GW 15 receives the message and, from the U-RNTI, identifies the target HNB 11-2 (from the data that it saved in step 65). The HNB-GW 15 then forwards the message, in step 69, to the target HNB 11-2. The target HNB 11-2 can then use the received information to encode the RRC CELL UPDATE CONFIRM message that it transmits back to the mobile telephone 3, in step 70, to complete the Cell Update procedure.

2.2 Cell Update Handling—Macro to HNB

In Rel'9, there is no Iur connection between the HNB 11 or the HNB-GW 15 and the macro RNC 7. This means that when a target HNB 11-2 receives a Cell Update message from a mobile telephone 3 which is moving from a macro base station 5 to an HNB 11, due to the absence of the Iur interface, the target HNB 11-2 can not perform context fetch from the macro RNC 7.

When the target HNB 11-2 detects that the U-RNTI reported in the RRC CELL UPDATE message is NOT allocated by it and if it knows that the RNC ID is that of a macro RNC 7, then it can initiate "Directed Signalling Connection Reestablishment". This process is described in detail in standards technical specification TS 24.008 V9.0.0, the content of which is incorporated herein by reference.

In order to be able to do this, the target HNB 11-2 should not only know the RNC ID of its neighbours but also whether the neighbour is an HNB or a macro cell. There are two ways that this information can be provided to the HNBs 11:
1. HMS 17 shall include, for each neighbouring cell, a new cell type IE in the neighbouring cell information that it sends to an HNB 11. The cell type can be either "HNB" or "Macro".
2. If the RNC ID range that is reserved for macro cells and (HNB) cells are known, then the HMS 17 could send each HNB 11 the range of RNC IDs that will be used for HNB cells and the range of RNC IDs that will be used for macro cells.

Mobile Telephone

Figure 7:
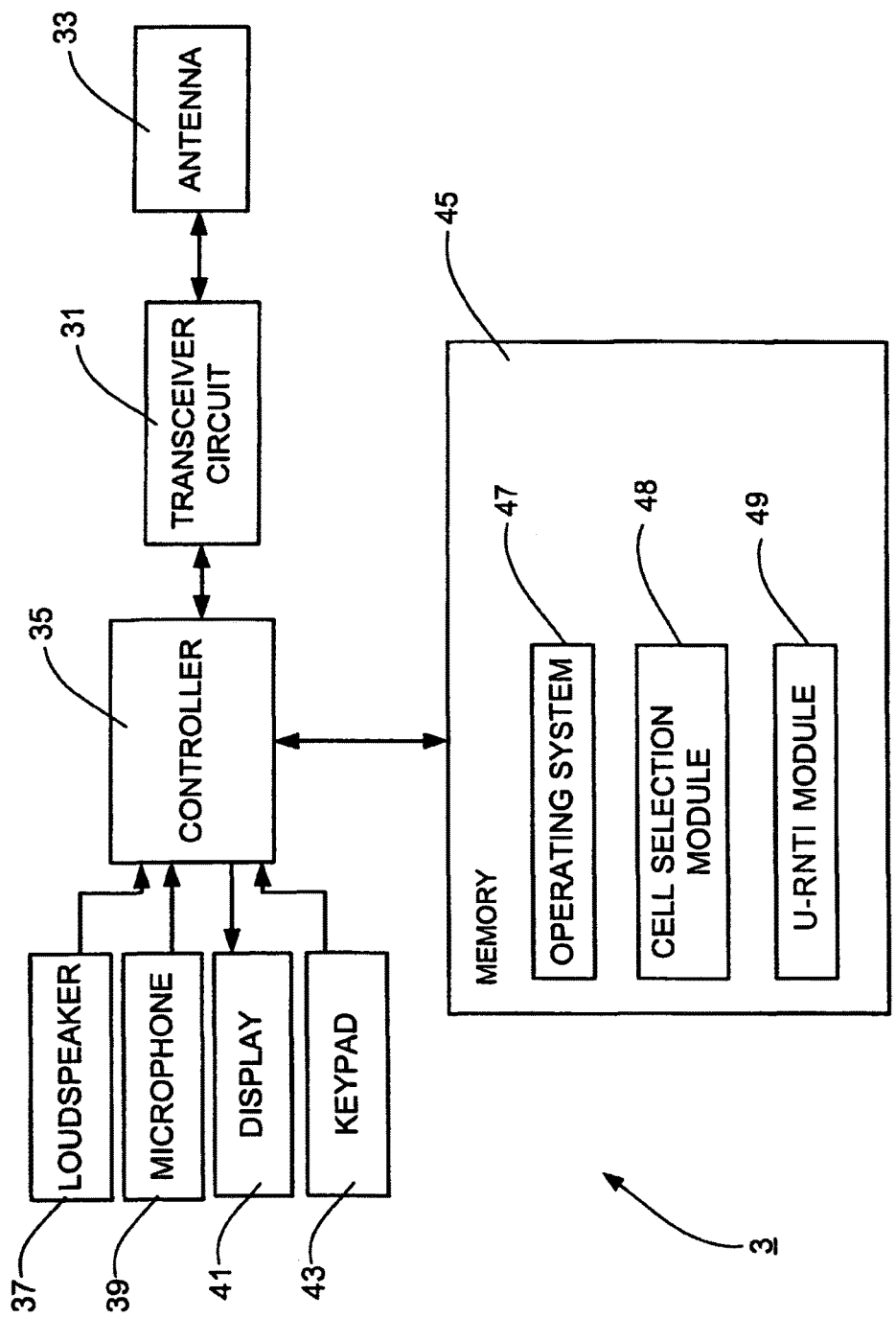
FIG. 7 is a block diagram of the mobile telephone forming part of the system shown in FIG. 1.

FIG. 7 schematically illustrates the main components of the mobile telephone 3 shown in FIG. 1. As shown, the mobile telephone 3 includes transceiver circuit 31 which is operable to transmit signals to and to receive signals from the base station 5 or HNB 11 via one or more antennae 33. As shown, the mobile telephone 3 also includes a controller 35 which controls the operation of the mobile telephone 3 and which is connected to the transceiver circuit 31 and to a loudspeaker 37, a microphone 39, a display 41, and a keypad 43. The controller 35 operates in accordance with software instructions stored within memory 45. As shown, these software instructions include, among other things, an operating system 47, a cell selection module 48 and a U-RNTI module 49.

In this exemplary embodiment: the cell selection module 48 is operable to choose the cell (HNB/macro base station) with which to register and to which the Cell Update message is to be sent. The U-RNTI module 49 is operable to maintain an U-RNTI that has been allocated by an HNB 11, even after the mobile telephone 3 returns to an Idle state from a connected state.

Home Base Station

Figure 8:
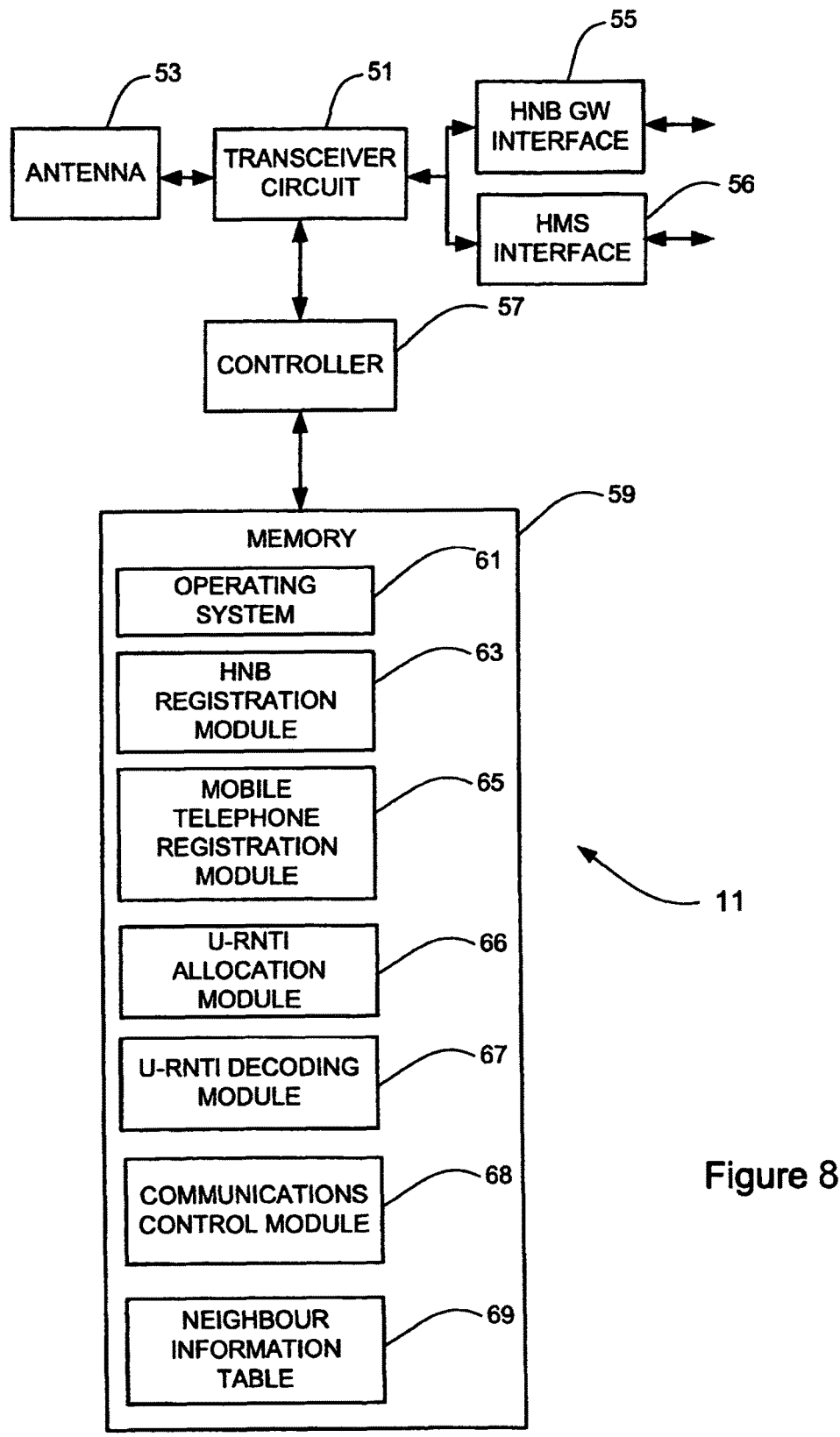
FIG. 8 is a block diagram of a home base station forming part of the system shown in FIG. 1.

FIG. 8 is a block diagram illustrating the main components of each of the home base stations (HNBs) 11 shown in FIG. 1. As shown, each HNB 11 includes transceiver circuit 51 which is operable to transmit signals to, and to receive signals from, the mobile telephone 3 via one or more antennae 53; which is operable to transmit signals to and to receive signals from the HNB-GW 15 via an HNB-GW interface 55; and which is operable to transmit signals to and to receive signals from the HMS 17 via HMS interface 56. The operation of the transceiver circuit 51 is controlled by a controller 57 in accordance with software stored in memory 59. Although not necessarily shown in FIG. 8, the home base station 11 will of course have all the usual functionality of a cellular telephone network home base station and this may be provided by any one or any combination of hardware, software and firmware, as appropriate. Software may be pre-installed in the memory 59 and/or may be downloaded via the telecommunications network 8 or from a removable data storage device.

The controller 57 is configured to control overall operation of the home base station 11 by, in this example, program instructions or software instructions stored within memory 59. As shown, these software instructions include, among other things, an operating system 61, an HNB registration module 63, a mobile telephone registration module 65, a U-RNTI allocation module 66, a U-RNTI decoding module 67, and a communications control module 68. The HNB registration module 63 is operable to register the HNB 11 with the HNB-GW 15 and the mobile telephone registration module 65 is operable to register the mobile telephone 3 with the HNB-GW 15. The U-RNTI allocation module 66 is operable, in some of the exemplary embodiments described above, to allocate the U-RNTI for a mobile telephone 3. The U-RNTI decoding module 67 is operable to decode the U-RNTI in the Cell Update message that it receives from a mobile telephone 3 and the communications control module 68 is operable to control the communications with the HNB-GW 15 or the HMS 17 in the manner described above. As shown in FIG. 8, the HNB 11 memory also stores the neighbour information table 69 that stores the relevant cell information that the HNB 11 receives from the HMS 17 and which the communications control module 68 uses in some of the exemplary embodiments described above to identify the source HNB 11-1 or the source macro base station 5.

Home Base Station Gateway

Figure 9:
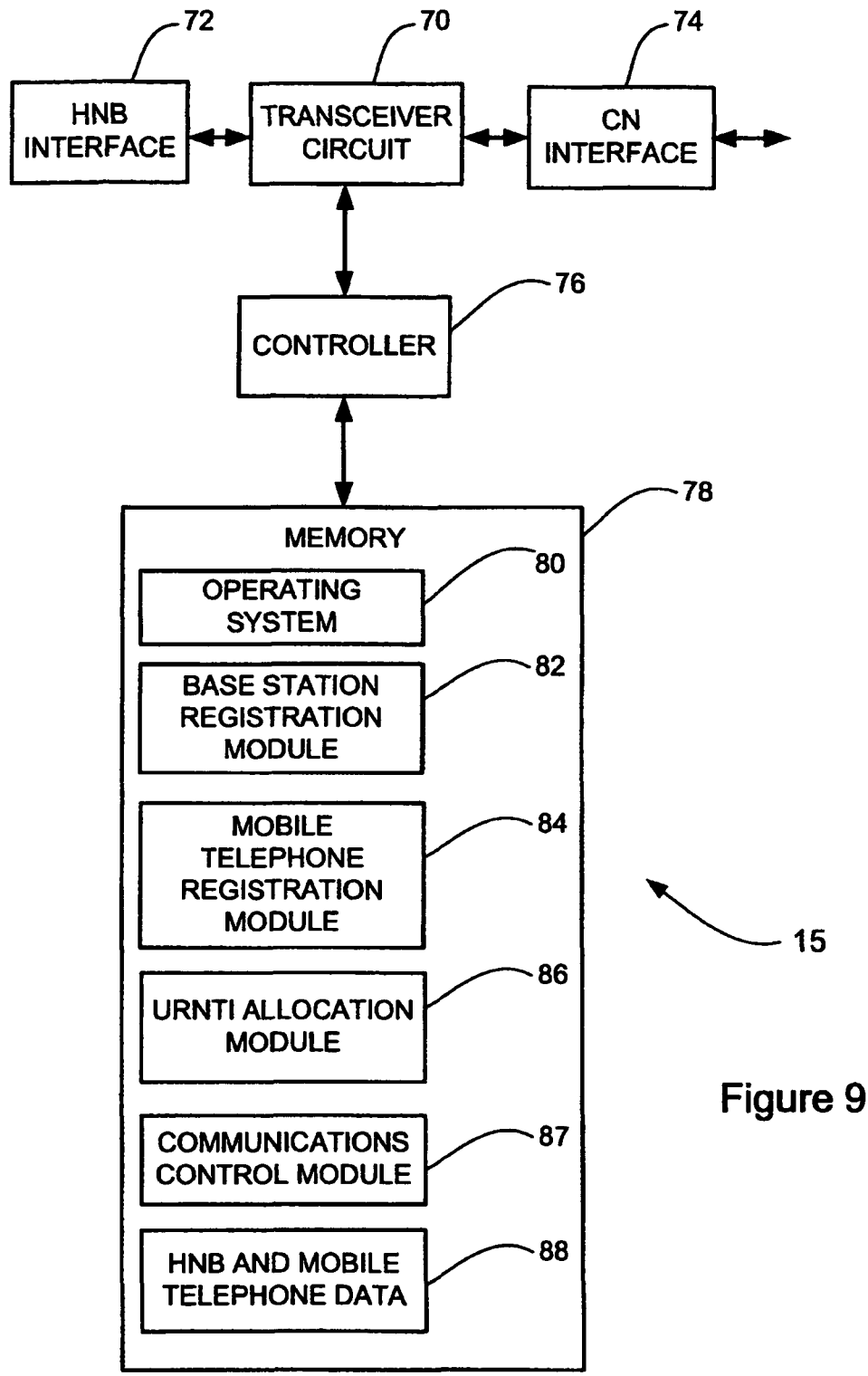
FIG. 9 is a block diagram of a home base station gateway forming part of the system shown in FIG. 1.

FIG. 9 is a block diagram illustrating the main components of the home base station gateway (HNB-GW) 15 shown in FIG. 1. As shown, the HNB-GW 15 includes transceiver circuit 70 which is operable to transmit signals to and to receive signals from, the HNB 11 via an HNB interface 72 and which is operable to transmit signals to, and to receive signals from, the CN 8 via a CN interface 74. The operation of the transceiver circuit 70 is controlled by a controller 76 in accordance with software stored in memory 78. Although not necessarily shown in FIG. 9, the HNB-GW 15 will of course have all the usual functionality of a cellular telephone HNB-GW and this may be provided by any one or any combination of hardware, software and firmware, as appropriate. Software may be pre-installed in the memory 78 and/or may be downloaded via the telecommunications network 8 or from a removable data storage device.

The controller 76 is configured to control overall operation of the home base station gateway 15 by, in this example, program instructions or software instructions stored within memory 78. As shown, the software includes, among other things, an operating system 80, a base station registration module 82, a mobile telephone registration module 84, a U-RNTI allocation module 86 and a communications control module 87. The base station registration module 82 is operable for registering an HNB 11 with the gateway and the mobile telephone registration module is responsible for registering a mobile telephone 3 with the gateway 15. The U-RNTI allocation module 86 is operable in some of the exemplary embodiments described above to allocate the U-RNTI to the mobile telephone 3; and the communications control module 87 is operable to control the various communications between the source HNB 11-1 and the target HNB 11-2 described above. The memory 78 of the HNB-GW 15 also includes HNB and mobile telephone data 88, that stores, in some embodiments, the U-RNTI allocated to a mobile telephone 3 and the RNCID-for-HNB of the serving HNB.

HMS

Figure 10:
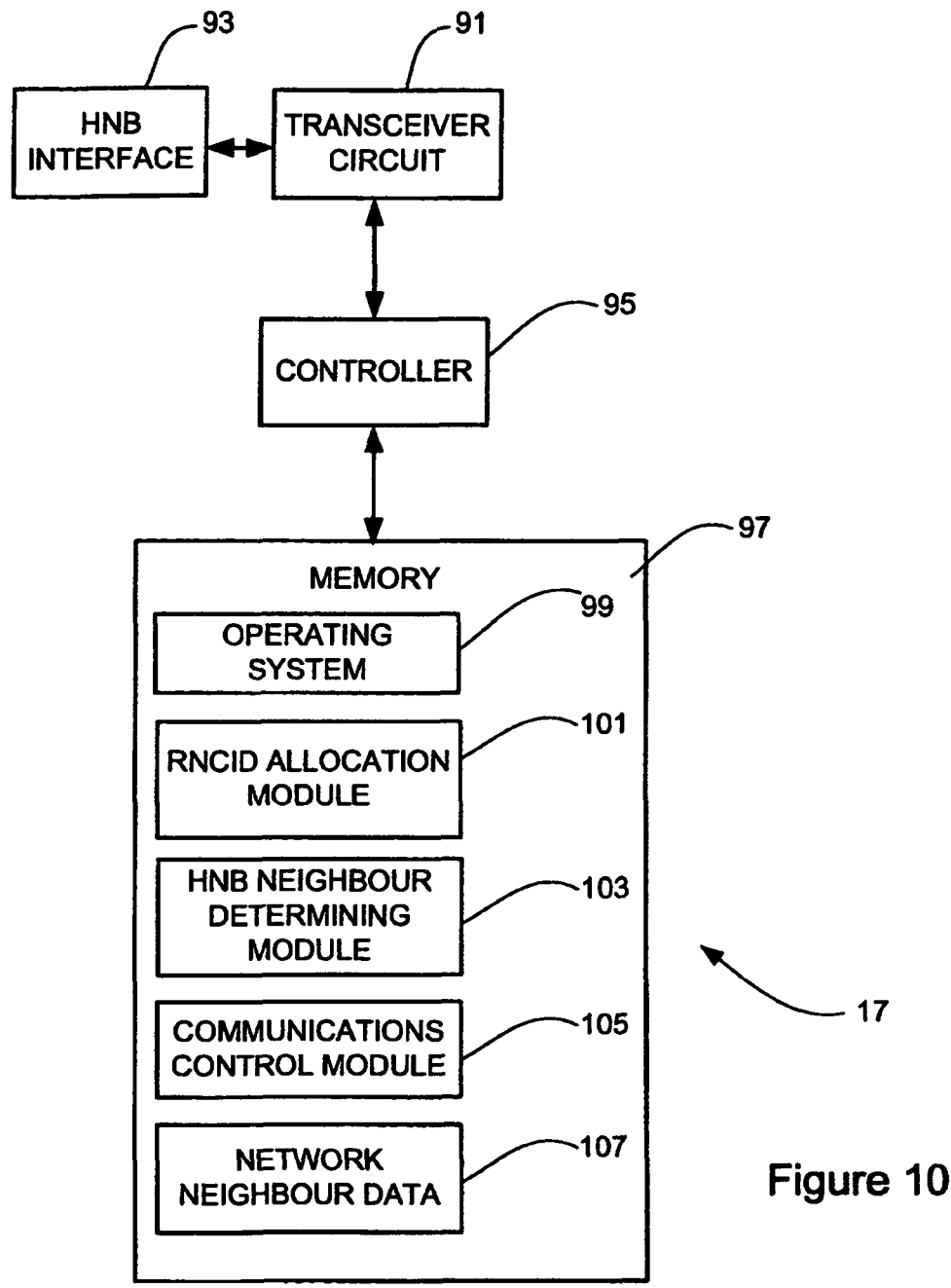
FIG. 10 is a block diagram of an HNB Management System forming part of the system shown in FIG. 1.

FIG. 10 is a block diagram illustrating the main components of the HNB Management System 17 shown in FIG. 1. As shown, the HMS 17 includes transceiver circuit 91 which is operable to transmit signals to, and to receive signals from, HNBs 11 via an HNB interface 93. The operation of the transceiver circuit 91 is controlled by a controller 95 in accordance with software stored in memory 97. Although not necessarily shown in FIG. 10, the HMS 17 will of course have all the usual functionality of a cellular telephone network HMS 17 and this may be provided by any one or any combination of hardware, software and firmware, as appropriate. Software may be pre-installed in the memory 97 and/or may be downloaded via the telecommunications network 8 or from a removable data storage device.

The controller 95 is configured to control overall operation of the HMS 17 by, in this example, program instructions or software instructions stored within memory 97. As shown, these software instructions include, among other things, an operating system 99, an RNCID allocation module 101, an HNB neighbour determining module 103 and a communications control module 105. The RNCID allocation module 101 is operable to allocate, in some embodiments, a unique (at least in vicinity) RNCID-for-HNB to each HNB 11. The HNB neighbour determining module 103 is operable, in some embodiments, for identifying the neighbouring cells (both HNB and macro) to each HNB and for providing the RNCIDs for those neighbouring cells to the HNB 11. The communications control module 105 is operable to control the various communications with the HNBs 11 discussed above. The memory of the HMS 17 also stores network neighbour data 107 that stores data identifying the network topology that defines which nodes (base stations) are next to each other. The HNB neighbour determining module 103 uses this data 107 to identify the HNBs and macro base stations in the vicinity of each HNB 11.

In the above description, the mobile telephone 3, the home base station 11, the home base station gateway 15 and the HMS 17 are described, for ease of understanding, as having a number of discrete modules (base station registration modules, telephone registration modules, U-RNTI modules etc.). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Modifications and Alternatives

A number of exemplary embodiments have been described above. As those skilled in the art will appreciate, a number of modifications and alternatives can be made to the above exemplary embodiments whilst still benefiting from the inventions embodied therein.

In the above exemplary embodiments, a mobile telephone based telecommunications system was described. As those skilled in the art will appreciate, the signalling techniques described in the present application can be employed in other communications systems. Other communications nodes or devices may include user devices such as, for example, personal digital assistants, laptop computers, web browsers, etc.

In the exemplary embodiments described above, the mobile telephone and the HNB each include transceiver circuit. Typically this circuit will be formed by dedicated hardware circuits. However, in some exemplary embodiments, part of the transceiver circuit may be implemented as software run by the corresponding controller.

In the above exemplary embodiments, a number of software modules were described. As those skilled in the art will appreciate, the software modules may be provided in compiled or un-compiled form and may be supplied to the HNB, the HMS or the HNB-GW as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

Whilst specific communication nodes have been described (e.g. HNB, base stations, RNC) in the description it will be appreciated that the description may apply equally to other nodes having similar functionality.

Various other modifications will be apparent to those skilled in the art and will not be described in further detail here.

Glossary of 3GPP Terms
HNB—Home Base Station
RNC—Radio Network Controller
UE—User Equipment
HNB-GW—HNB gateway
HMS—HNB Management System
PLMN—Public Land Mobile Network
UTRAN—Universal Terrestrial Radio Access Network
U-RNTI—UTRAN Radio Network Temporary Identifier For details of the RUA messages, the reader is referred to 3GPP standards document 3GPP TS 25.468 V8.1.0-UTRAN Iuh Interface RANAP User Adaption (RUA) signalling; for HNBAP messages to 3GPP standards document 3GPP TS 25.469, V8.2.0-UTRAN Iuh interface Home Node B Application Part (HNBAP) signalling; and for RANAP messages to 3GPP standards document 3GPP TS 25.413, V8.3.0-UTRAN Iu interface Radio Access Network Application Part (RANAP) signalling.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1. INTRODUCTION

Connected mode mobility from one HNB to another HNB in CELL FACH state is currently under discussion [1], [2] in Release 9. Although connected mode mobility in CELL FACH is not supported in Release 8, handling of RRC CELL UPDATE message by Target HNB shall be supported in the same way as Macro Target RNC handles CELL UPDATE message when there is no Iur. This document discusses the solution for handling the cell update message from UE by a Target HNB both in Rel'8 and Rel'9.

2. DISCUSSION 2.1 Handling Cell Update Message in Rel'8

In Rel'8, the only feasible way of handling a CELL UPDATE message by a Target HNB is that Target HNB initiates the "Directed Signaling Connection Reestablishment" when the Target HNB detects that the URNTI reported in RRC CELL UPDATE message is allocated by it. In order to support this handling, URNTI shall be allocated based on unique (uniqueness at least in vicinity) SRNC-ID as discussed in [3].

2.2 Handling Cell Update Message in Rel'9

Release 9, SRNC ID need not be unique in vicinity but then some extra signaling is required for URNTI allocation/management. As of now, it is unclear which RNC ID is used for URNTI allocation and whether those RNC IDs are same OR different for neighboring HNBs. So following section will describe the handling of cell update message in all these cases of URNTI allocation. It is clear from [3] that in Rel'9 there are 6 possible ways of allocating U-RNTI.

7. U-RNTI Allocation based on PLMN-wide unique RNCID-for-HNB
8. U-RNTI Allocation based on PLMN-wide unique GW-RNC-Id
9. U-RNTI Allocation based on vicinity-wide unique RNCID-for-HNB
10. U-RNTI Allocation based on vicinity-wide unique GW-RNC-Id
11. U-RNTI Allocation based on "non" unique RNCID-for-HNB
12. U-RNTI Allocation based on "non" unique GW-RNC-Id Cell Update handling in case of (1) and (3) is same. Cell Update handling in case of (2) and (4) is same. Cell update handling in case of (5) will not be explained because as mentioned in [3], (5) is complex.

So this section explains below Cell Update handling scenarios:
Cell Update handling with unique (at least in vicinity) RNCID-for-HNB used for U-RNTI Allocation (1) and (3)
Cell Update handling with unique (at least in vicinity) GW-RNC-Id used for U-RNTI Allocation (2) and (4)
Cell Update handling with "not" unique GW-RNC-Id used for U-RNTI Allocation (6)

Figure 11:
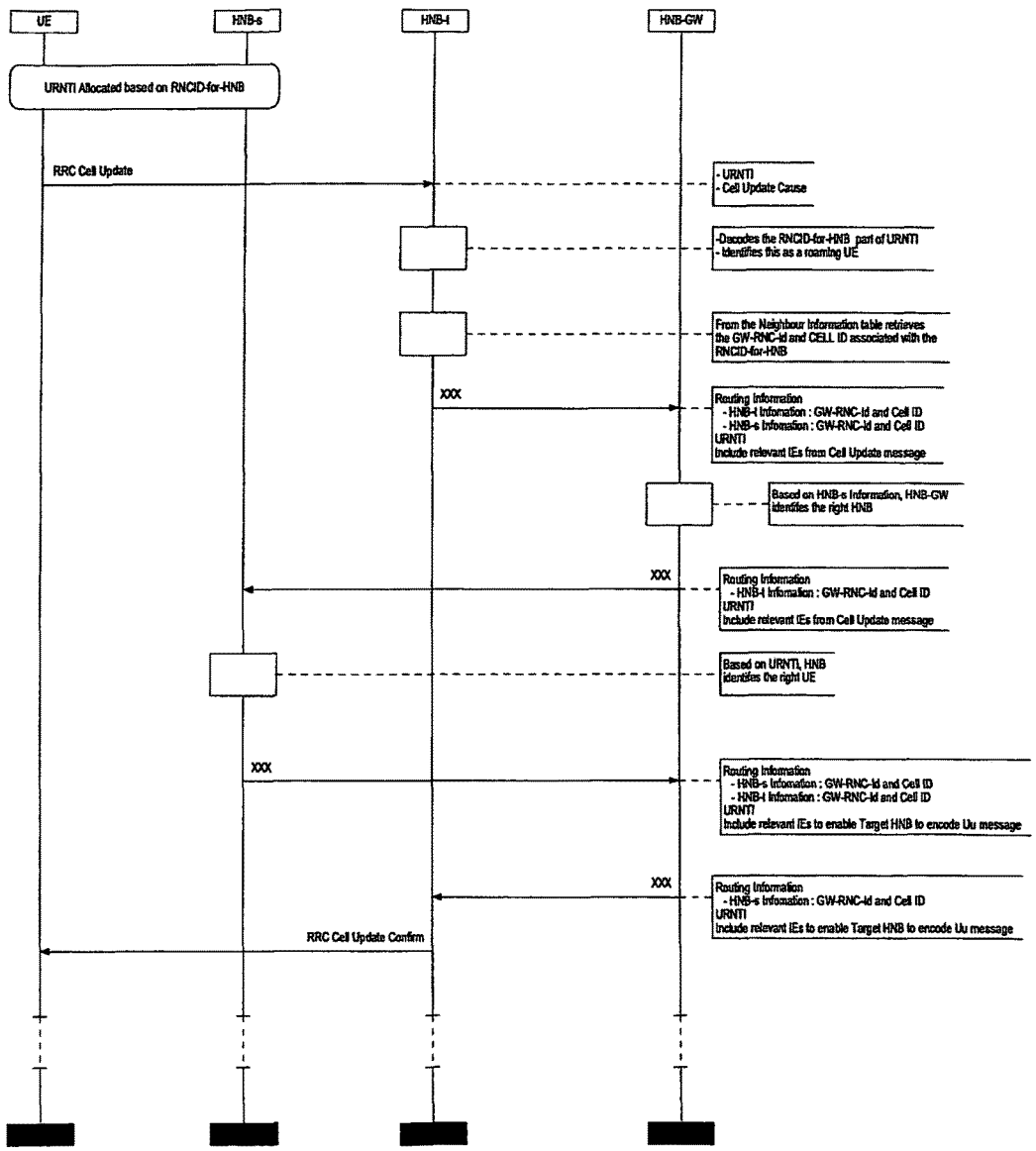
FIG. 11 is a timing diagram illustrating a signalling sequence of Cell Update handling when RNCID-for-HNB is used for U-RNTI Allocation.

2.2.1 Cell Update Handling when Unique RNCID-for-HNB is Used for U-RNTI Allocation 2.2.1.1 Alternative 1: RNCID-for-HNB for each Neighbor Kept at HNB The signaling sequence of this method can be shown in FIG. 11:

Target HNB should know GW-RNC-Id and CELL ID of the Source HNB from which the UE is moving out. Target HNB knows that the UE is an incoming to its service area by URNTI analysis. From URNTI analysis, Target HNB will know the RNCID-for-HNB of the Source HNB. There is a one to one relationship between RNCID-for-HNB and other information in the neighbour cell configuration i.e. RNCID-for-HNB is unique for each entry in the neighboring cell information maintained by the HNBs. The Target HNB then can easily know GW-RNC-Id and CELL ID of the Source HNB by neighbour cell information table look up.

In order to enable such look up by the HNB, the HMS should provide the RNCID-for-HNB of the neighboring HNBs during Discovery procedure. The neighbour cell information at a HNB is shown in Table 3:

TABLE 3

Example Neighbour Cell Information with RNCID-for-HNB at HNB in Rel'9

| Neighbour Cell# | Scrambling Code | Cell ID | RNC ID(*) | CSG ID | RNCID-for-HNB |
|---|---|---|---|---|---|
| 1 (HNB Cell) | 100 | 200 | GW-RNC-Id = 1 | 10 | 111 |
| 2 (HNB Cell) | 101 | 201 | GW-RNC-Id = 1 | 20 | 222 |
| 3 (HNB Cell) | 102 | 202 | GW-RNC-Id = 1 | 30 | 333 |
| 4 (HNB Cell) | 103 | 203 | GW-RNC-Id = 1 | 40 | 444 |
| 5 (Macro Cell) | 104 | 204 | 2 | Not Applicable | Not Applicable |
| 6 (Macro Cell) | 105 | 205 | 2 | Not Applicable | Not Applicable |

(*)This RNC ID is used in RANAP RELOCATION REQUIRED message

If HNBs maintains RNCID-for-HNB in the Neighbour Cell Information table, then the Target HNB can derive the RNCID-for-HNB from the URNTI, and then look up the Table to find out the GW-RNC-Id and CELL ID.

Target HNB sends message XXX. HNB-GW looks into few IEs (HNB-s' GW-RNC Id and CELL ID) to know to which HNB, this message should be forwarded. Source HNB, then checks the URNTI and identifies the UE. Source HNB sends all necessary IEs required for encoding RRC CELL UPDATE CONFIRM to the Target HNB via HNB-GW.

Proposal 1a: HMS shall send RNCID-for-HNB of the all the neighboring HNBs to each HNB during discovery procedure as well as there is change in neighboring information.

Proposal 1b: New HNBAP messages shall be introduced or existing RNSAP message shall be used for Target HNB and Source HNB interaction.

The neighbor information has dynamic nature. HMS needs to frequently send neighbor information to each HNB. Also HMS-HNB communication is not done at real time. This means as in case of NMM, the Neighbor Cell Information kept at HNB based on HMS signaling also may not reflect correct status of neighbors p 2.2.1.2 Alternative 2: RNCID-for-HNB for each Neighbor Kept at HNB-GW Alternative 1 suffers from fact that frequent update of neighbour information is required. The bottleneck in Alternative 1 is having RNCID-for-HNB of all current neighbors. This can not be ensured because of delay in HMS signaling in updating the neighbour information.

In Alternative 2,

RNCID-for-HNB is sent to HNB-GW in HNBAP HNB REGISTER REQUEST.

There is one to one mapping between RNCID-for-HNB and the Cell ID as the Cell ID is unique in PLMN and HMS ensures neighboring HNBs does not have same RNCID-for-HNB Target HNB.

Target HNB, decodes the RNCID-for-HNB from UNRTI and sends RNCID-for-HNB to the HNB-GW HNB-GW can route the CELL UPDATE message to right Source HNB

. . .

Alternative 2 introduce new IE SRNC ID in HNBAP HNB REGISTER REQUEST message

HNB Register Request

TABLE 4

| PARAMETER | PRESENCE | RANGE | IE Type and Reference | Semantics Description | Criticality | Assigned Criticality |
|---|---|---|---|---|---|---|
| Message Type | M | | 9.2.1 | | YES | Reject |
| HNB Identity | M | | 9.2.2 | | YES | Reject |
| HNB Location Information | M | | 9.2.3 | | YES | Reject |
| PLMN-ID | M | | 9.2.14 | | YES | Reject |
| Cell-ID | M | | 9.2.25 | | YES | Reject |
| LAC | M | | 9.2.11 | | YES | Reject |
| RAC | M | | 9.2.12 | | YES | Reject |
| SAC | M | | 9.2.13 | | YES | Reject |
| SRNC ID | M | | x.x.x.x | HNB encodes the RNCID-for-HNB received from HMS. HNB-GW shall use this SRNC ID for U-RNTI Allocation | YES | Reject |
| CSG-ID | O | | 9.2.27 | | YES | Reject |

Figure 12:
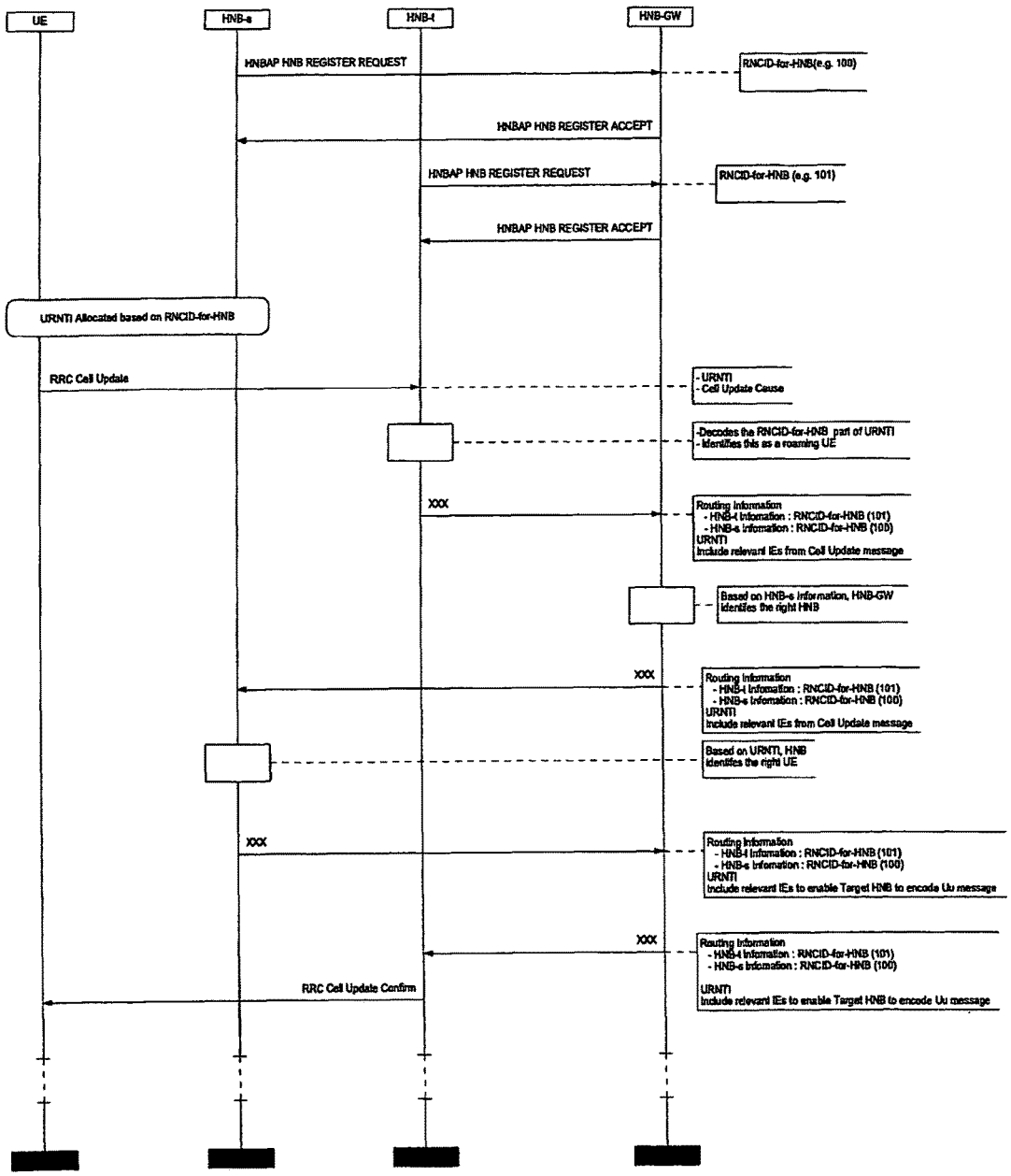
FIG. 12 is a timing diagram illustrating another signalling sequence of Cell Update handling when RNCID-for-HNB is used for U-RNTI Allocation.

Proposal 1c: HNB sends RNCID-for-HNB received from HMS to the HNB-GW in HNBAP HNB REGISTER REQUEST message. HNB-GW shall use this RNC ID for U-RNTI management The signaling sequence of this method can be shown in FIG. 12:

Proposal 1d: New HNBAP messages shall be introduced or existing RNSAP message shall be used for Target HNB and Source HNB interaction.

2.2.2 Cell Update Handling when Unique GW-RNC-Id is Used for U-RNTI Allocation

Unique GW-RNC-Id can be extracted from the U-RNTI reported in CELL UPDATE message. This GW-RNC-Id (together with the Cell ID in the neighbor information table, in case uniqueness is limited to vicinity) is used for routing purposes i.e. to identify the correct HNB. The HNB with then identify the UE based on URNTI. In this approach, HNB-GW is unaware of URNTI.

Figure 13:
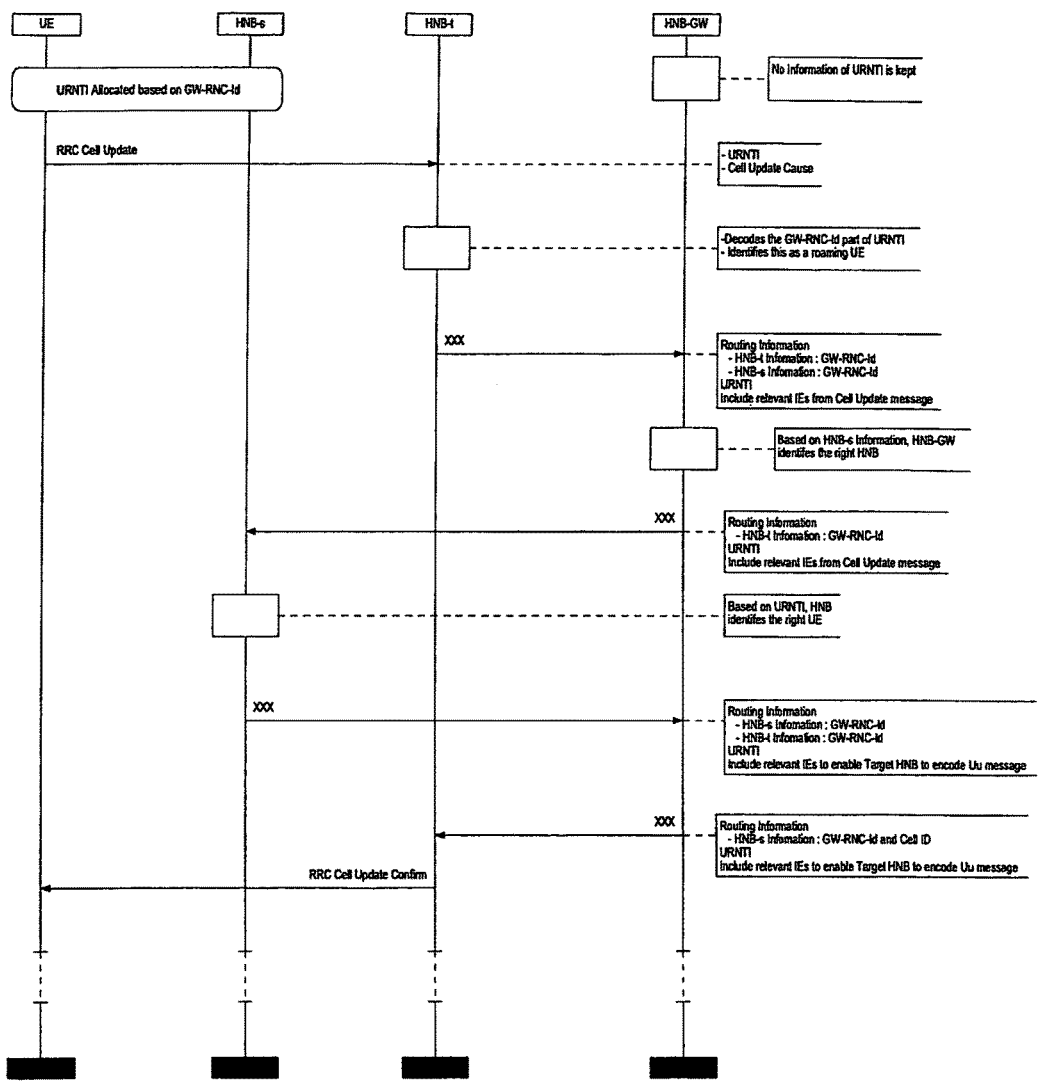
FIG. 13 is a timing diagram illustrating a signalling sequence of Cell Update handling when unique GW-RNC-Id is used for U-RNTI Allocation.

HNB-GW can identify the correct Source based on GW-RNC-Id, decoded by the Target HNB from URNTI analysis. The signaling sequence is shown in FIG. 13:

The unique GW-RNC-Id can be allocated to a HNB in two ways:

3. HNB-GW sends each HNB a different GW-RNC-Id but maintains single RNC ID towards CN i.e. CN sees the HNBs within a HNB-GW as one RNC. HNB-GW replaces the GW-RNC-Id send in RANAP messages from HNB with the RNC ID known by the CN and vice versa.

4. HNB-GW sends each HNB a different GW-RNC-Id which is also known to the CN. The CN sees each HNB as individual RNCs. Operators may not like this kind of RNC ID assignment.

Proposal 2a: New HNBAP messages shall be introduced or existing RNSAP message shall be used for Target HNB and Source HNB interaction.

Figure 14:
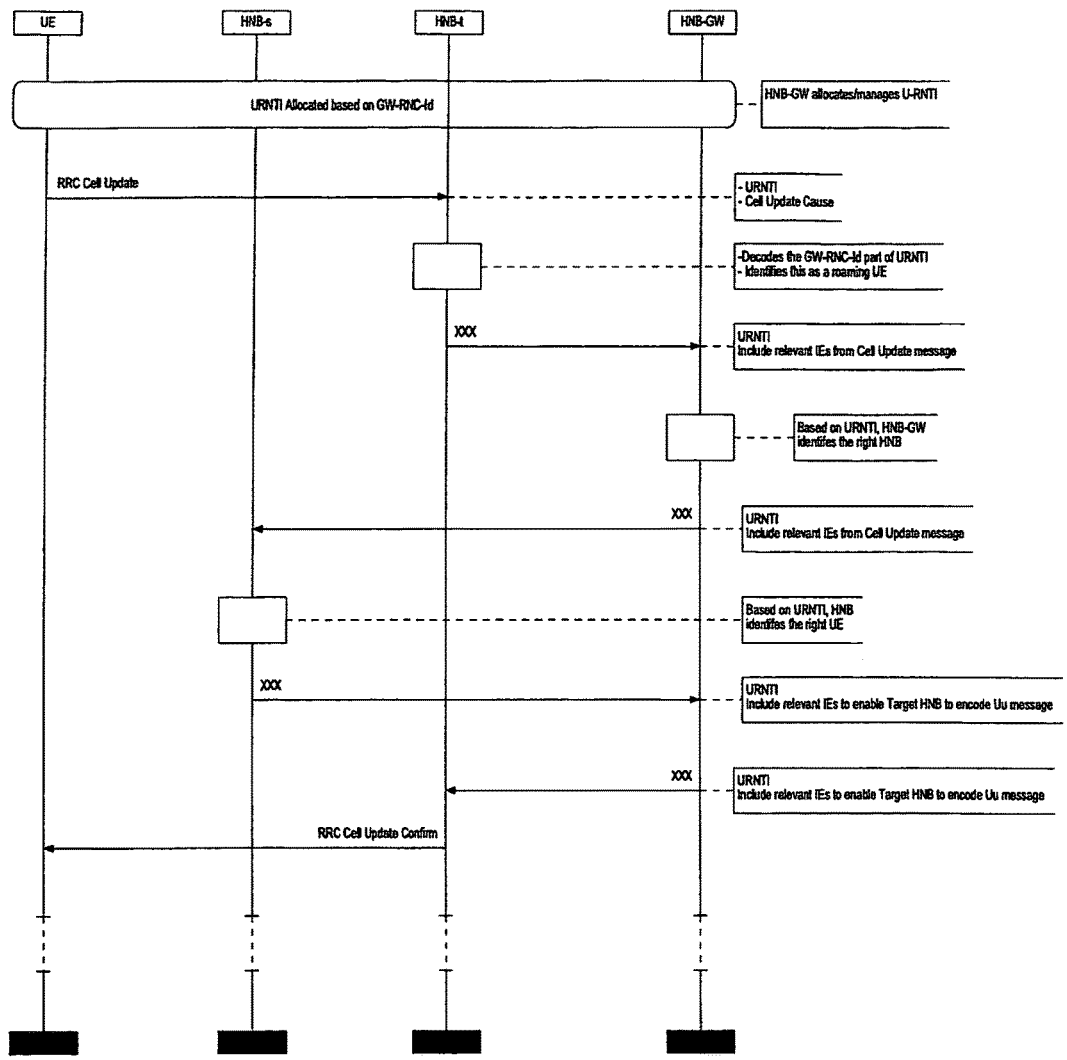
FIG. 14 is a timing diagram illustrating a signalling sequence of Cell Update handling when "not" unique GW-RNC-Id is used for U-RNTI Allocation.

2.2.1 Cell Update Handling when "not" Unique GW-RNC-Id is Used for U-RNTI Allocation In this case, HNB-GW assigns the URNTI as mentioned Section 2.6 of [3]. The Cell Update message is handled in FIG. 14 (logically same as [2]):

Proposal 3a: New HNBAP messages shall be introduced or existing RNSAP message shall be used for Target HNB and Source HNB interaction.

2.2.3 Comparison of Different Cases

3. HMS shall include cell type in each of neighbour cell information. The cell type can be either "HNB" or "Macro".

4. If the RNC ID range reserved for Macro cell and femto cell is known, HMS could send range of RNC IDs for used for HNB cells and range of RNC IDs for used for Macro cells to each HNB Proposal 4a: HMS shall include new Cell Type IE in the neighboring Cell Information sent to the HNB. If the neighboring cell is Macro, Cell Type is set as "Macro", otherwise "HNB".

Proposal 4b: HMS shall send range of RNC IDs reserved for macro RNCs and range of RNC IDs reserved for HNBs sent to the HNB.

3. PROPOSAL

Proposal 1a: HMS shall send RNCID-for-HNB of the all the neighboring HNBs to each HNB during discovery procedure as well as there is change in neighboring information.

Proposal 1b/1d/2/3: New HNBAP messages shall be introduced or existing RNSAP message shall be used for Target HNB and Source HNB interaction.

Proposal 1c: HNB sends RNCID-for-HNB received from HMS to the HNB-GW in HNBAP HNB REGISTER REQUEST message. HNB-GW shall use this RNC ID for U-RNTI management Proposal 4a: HMS shall include new Cell Type IE in the neighboring Cell Information sent to the HNB. If the neighboring cell is Macro, Cell Type is set as "Macro", otherwise "HNB".

Proposal 4b: HMS shall send range of RNC IDs reserved for macro RNCs and range of RNC IDs reserved for HNBs sent to the HNB.

4. REFERENCE

[1] R3-091884, Managing of U-RNTI over the Iuh interface, Kineto Wireless Inc.

TABLE 5

| | Cell Update handling when | | | |
|---|---|---|---|---|
| Comparison Item | Unique RNCID-for-HNB is used for U-RNTI Allocation (Alternative 1) | unique RNCID-for-HNB is used for U-RNTI Allocation (Alternative 2) | unique GW-RNC-Id is used for U-RNTI Allocation | not unique GW-RNC-Id is used for U-RNTI Allocation |
| Complexity | Very complex due to dynamic nature of neighbor relation | Elegant solution | Not complex | Not complex |
| Requirement of New HNBAP messages | Required | Required | Required | Required |

2.3 Handling Cell Update Message: from Macro to HNB

In Rel'9, there is no Iur connection between HNB/HNB-GW and Macro RNC. So when Target HNB receives Cell Update from UE which is moving from Macro to HNB coverage, sue to absence of Iur interface, Target HNB can not perform context fetch from the Macro.

When the Target HNB detects that the URNTI reported in RRC CELL UPDATE message is NOT allocated by it and if its knows the RNC ID is that of a Macro RNC, it take initiate "Directed Signaling Connection Reestablishment".

In order to enable this HNB should not only know the RNC ID of the neighbours but also whether the neighbour is a HNB or Macro cell. There are two alternatives

[2] R3-091885, Handling of cell update for inter HNB mobility, Kineto Wireless Inc This application is based upon and claims the benefit of priority from United Kingdom patent application No. 0917071.3, filed on Sep. 29, 2009, the disclosure of which is incorporated herein in its entirety by reference.

The invention claimed is:

1. A method performed by target communication apparatus in a communications network, the method comprising:
receiving a cell update message from a user equipment (UE), the cell update message including a Universal Mobile Telecommunications System (UMTS) Terrestrial Radio Access Network (UTRAN) Radio Network Temporary Identifier (U-RNTI), wherein the U-RNTI has been assigned to the UE by a source home base station (HNB), wherein the U-RNTI comprises a gateway (GW) radio network controller identifier (RNC ID) and further information previously assigned to the source HNB by a home base station gateway (HNB-GW);

detecting the HNB-GW of the source HNB by the GW RNC ID in the U-RNTI;

forwarding a message comprising the received cell update message to the HNB-GW; and engaging in a procedure to transfer a context associated with the UE from the source HNB to the target communication apparatus, following the forwarding of said cell update message.

2. A method according to the claim 1, wherein the HNB-GW is detected from neighbor nodes.

3. A target communication apparatus of a communications network, the target communication apparatus comprising:
a memory storing instructions; and
one or more processors configured to execute the instructions to:
receive a cell update message from a user equipment (UE), the cell update message including a Universal Mobile Telecommunications System (UMTS) Terrestrial Radio Access Network (UTRAN) Radio Network Temporary Identifier (U-RNTI), wherein the U-RNTI has been assigned to the UE by a source home base station (HNB), wherein the U-RNTI comprises a gateway (GW) radio network controller identifier (RNC ID) and further information previously assigned to the source HNB by a home base station gateway (HNB-GW);

detect the HNB-GW of the source HNB, by the GW RNC ID in the U-RNTI;

forward a message comprising the received cell update message to the HNB-GW; and engage in a procedure to transfer a associated with the UE from the source HNB to the target communication apparatus, following the forwarding of said cell update message.

4. The target communication apparatus according to claim 3, wherein, before assigning the U-RNTI to the UE, the source HNB registers with the HNB-GW and receives the RNC-ID assigned to the source HNB by HNB-GW.

5. A target communication apparatus according to the claim 3, wherein the HNB-GW is detected from neighbor nodes.

6. A non-transitory computer readable recording medium comprising computer implementable instructions for causing a programmable device to perform the method comprising:
receiving a cell update message from a user equipment (UE), the cell update message including a Universal Mobile Telecommunications System (UMTS) Terrestrial Radio Access Network (UTRAN) Radio Network Temporary Identifier (U-RNTI), wherein the U-RNTI has been assigned to the UE by a source home base station (HNB), wherein the U-RNTI comprises a gateway (GW) radio network controller identifier (RNC ID) and further information previously assigned to the source HNB by a home base station gateway (HNB-GW);

detecting the HNB-GW of the source HNB, by the GW RNC ID in the U-RNTI; and forwarding a message comprising the received cell update message to the HNB-GW; and engaging in a procedure to transfer a context associated with the UE from the source HNB to the target communication apparatus, following the forwarding of said cell update message.

7. A non-transitory computer readable recording medium according to the claim 6, wherein the HNB-GW is detected from neighbor nodes.

* * * * *

UNITED STATES PATENT AND TRADEMARK OFFICE
CERTIFICATE OF CORRECTION

PATENT NO. : 9,980,126 B2
APPLICATION NO. : 13/498579
DATED : May 22, 2018
INVENTOR(S) : Suresh Ganapathy et al.

It is certified that error appears in the above-identified patent and that said Letters Patent is hereby corrected as shown below:

In the Claims

Column 22, Claim 3, Line 1; after "a", insert --context--

Column 22, Claim 6, Line 27; after "U-RNTI;", delete "and"

Signed and Sealed this
Fifth Day of February, 2019

Andrei Iancu
*Director of the United States Patent and Trademark Office*